United States Patent
Nakajima

(10) Patent No.: US 10,378,886 B2
(45) Date of Patent: Aug. 13, 2019

(54) THREE DIMENSIONAL MEASUREMENT APPARATUS, CONTROL METHOD FOR THREE DIMENSIONAL MEASUREMENT APPARATUS, AND STORAGE MEDIUM

(71) Applicant: CANON KABUSHIKI KAISHA, Tokyo (JP)

(72) Inventor: Masaki Nakajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 368 days.

(21) Appl. No.: 15/175,324

(22) Filed: Jun. 7, 2016

(65) Prior Publication Data

US 2016/0364872 A1 Dec. 15, 2016

(30) Foreign Application Priority Data

Jun. 11, 2015 (JP) .................................. 2015-118605

(51) Int. Cl.
*G01B 11/25* (2006.01)
*G06T 7/521* (2017.01)

(52) U.S. Cl.
CPC .............. *G01B 11/25* (2013.01); *G06T 7/521* (2017.01); *G06T 2207/10144* (2013.01); *G06T 2207/20216* (2013.01)

(58) Field of Classification Search
CPC ............... H04N 5/2353; G01B 21/047; G01B 11/0608; G01B 11/25
See application file for complete search history.

(56) References Cited

U.S. PATENT DOCUMENTS 6,876,392 B1 * 4/2005 Uomori ................... G01S 7/481
348/347
8,786,679 B2 * 7/2014 Nakajima .......... H04N 13/0239
348/47

(Continued)

FOREIGN PATENT DOCUMENTS

JP          62021011 A     1/1987
JP        2002100291 A     4/2002

(Continued)

OTHER PUBLICATIONS

Office Action issued in Japanese Appln. No. 2015-118605 dated Mar. 1, 2019.

(Continued)

*Primary Examiner* — Wesley J Tucker
(74) *Attorney, Agent, or Firm* — Rossi, Kimms & McDowell LLP

(57) ABSTRACT

A three dimensional measurement apparatus that measures a three-dimensional shape of a measurement subject based on an image obtained by capturing, by an image capturing unit, the measurement subject onto which a pattern is projected, the apparatus comprising: a compositing unit configured to composite a first image and a second image of the measurement subject respectively obtained under first imaging conditions and second imaging conditions that are different from the first imaging conditions, so that a relationship of an exposure amount produced by light incident on an image sensor of the image capturing unit and the magnitude of a luminance value corresponding to the exposure amount is maintained between the first image and the second image; and a measuring unit configured to measure the three-dimensional shape of the measurement subject based on the image composited by the compositing unit.

14 Claims, 18 Drawing Sheets

(56) References Cited

U.S. PATENT DOCUMENTS

| | | | | |
|---|---|---|---|---|
| 2009/0022367 | A1* | 1/2009 | Sasaki | G01B 11/25 382/103 |
| 2014/0071243 | A1* | 3/2014 | Nakatsukasa | G01B 11/25 348/46 |
| 2014/0160243 | A1* | 6/2014 | Tsuyuki | G01B 11/254 348/46 |
| 2015/0116582 | A1* | 4/2015 | Yoshikawa | H04N 5/2353 348/362 |
| 2016/0161250 | A1* | 6/2016 | Nakamura | G01B 11/2518 356/610 |
| 2016/0373628 | A1* | 12/2016 | Nakajima | H04N 5/21 |
| 2017/0287157 | A1* | 10/2017 | Seto | G06T 7/60 |

FOREIGN PATENT DOCUMENTS

| | | |
|---|---|---|
| JP | 2005003385 A | 1/2005 |
| JP | 2007271530 A | 10/2007 |
| JP | 2007315864 A | 12/2007 |
| JP | 2009165558 A | 7/2009 |
| JP | 2013055610 A | 3/2013 |
| JP | 2014036401 A | 2/2014 |
| JP | 2015087243 A | 5/2015 |

OTHER PUBLICATIONS

Office Action issued in Japanese Appln. No. 2015-118605 dated Jun. 24, 2019.

* cited by examiner

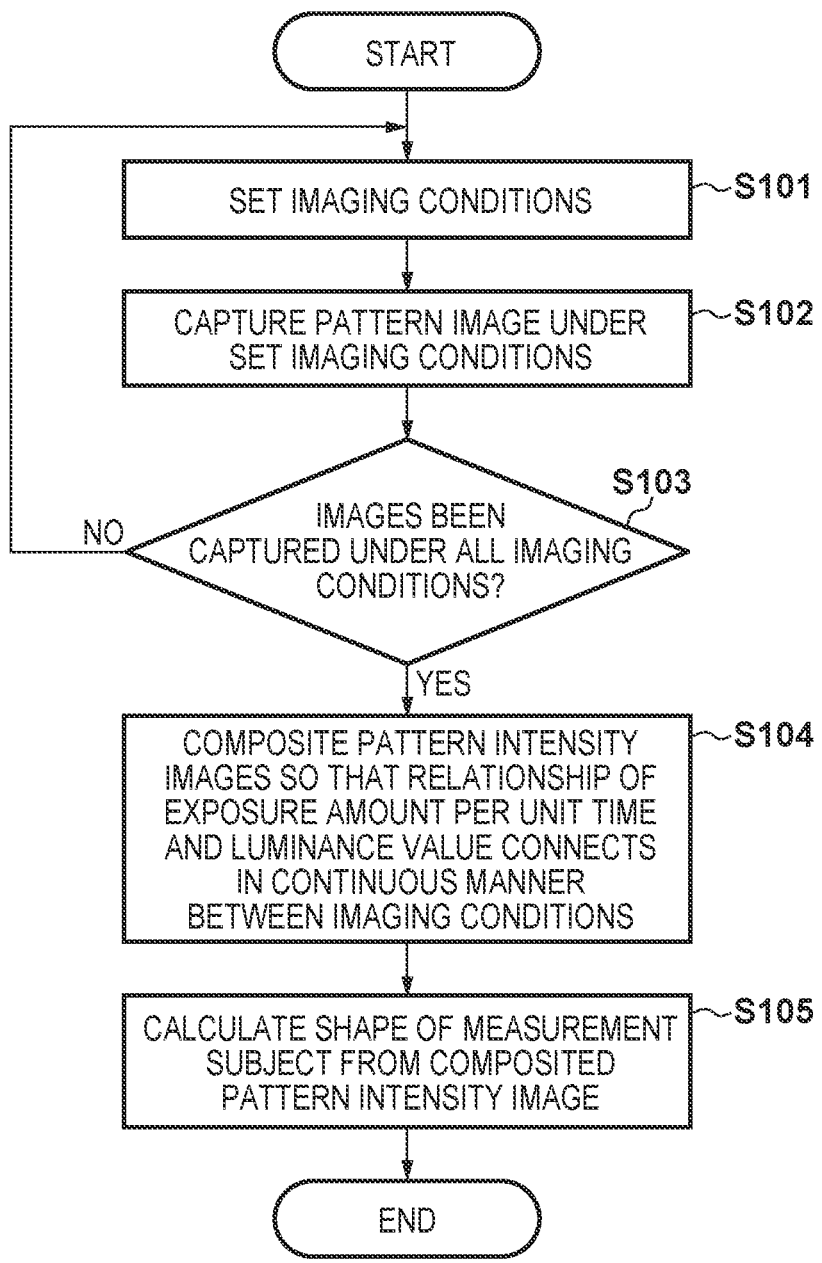

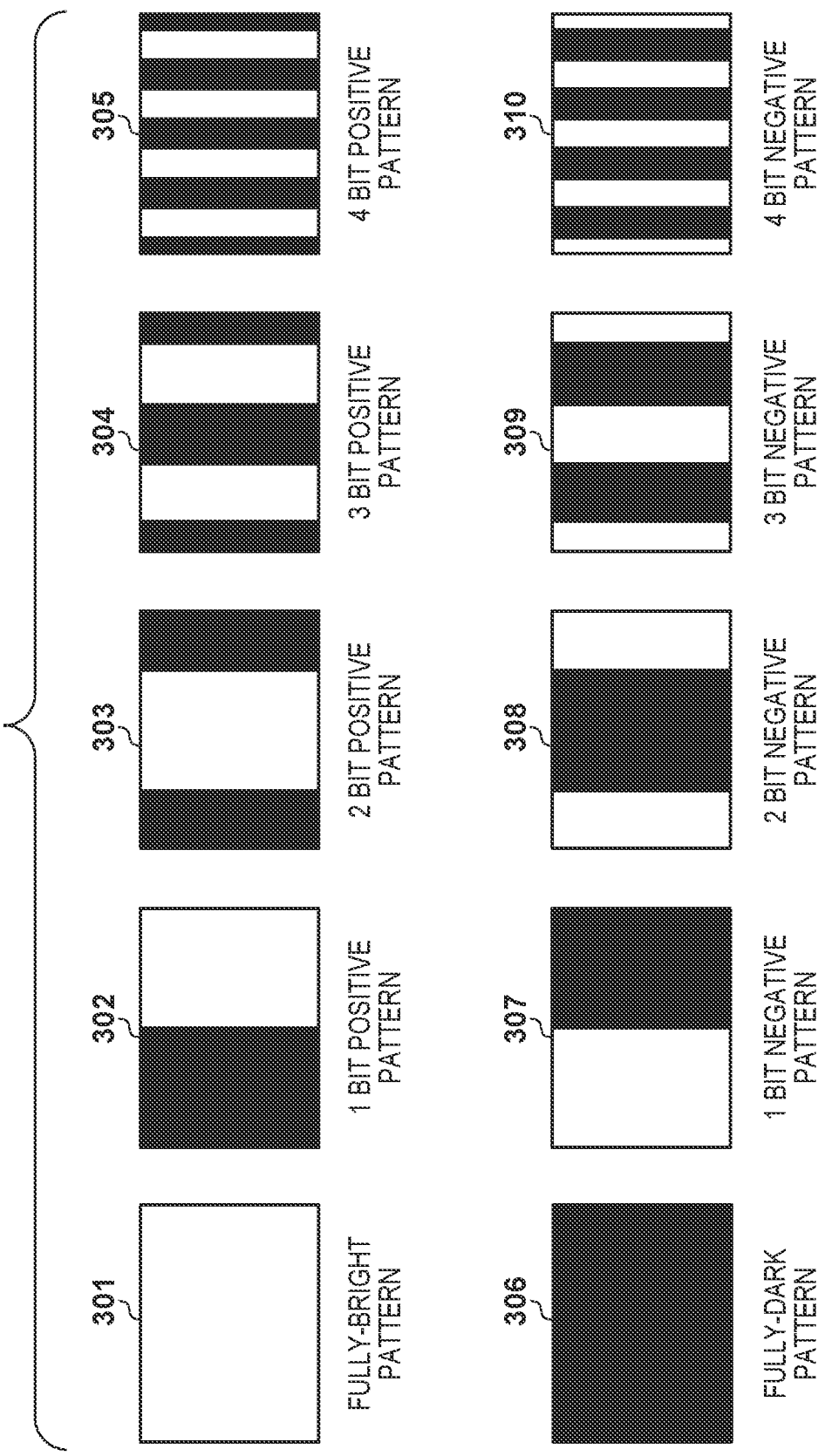

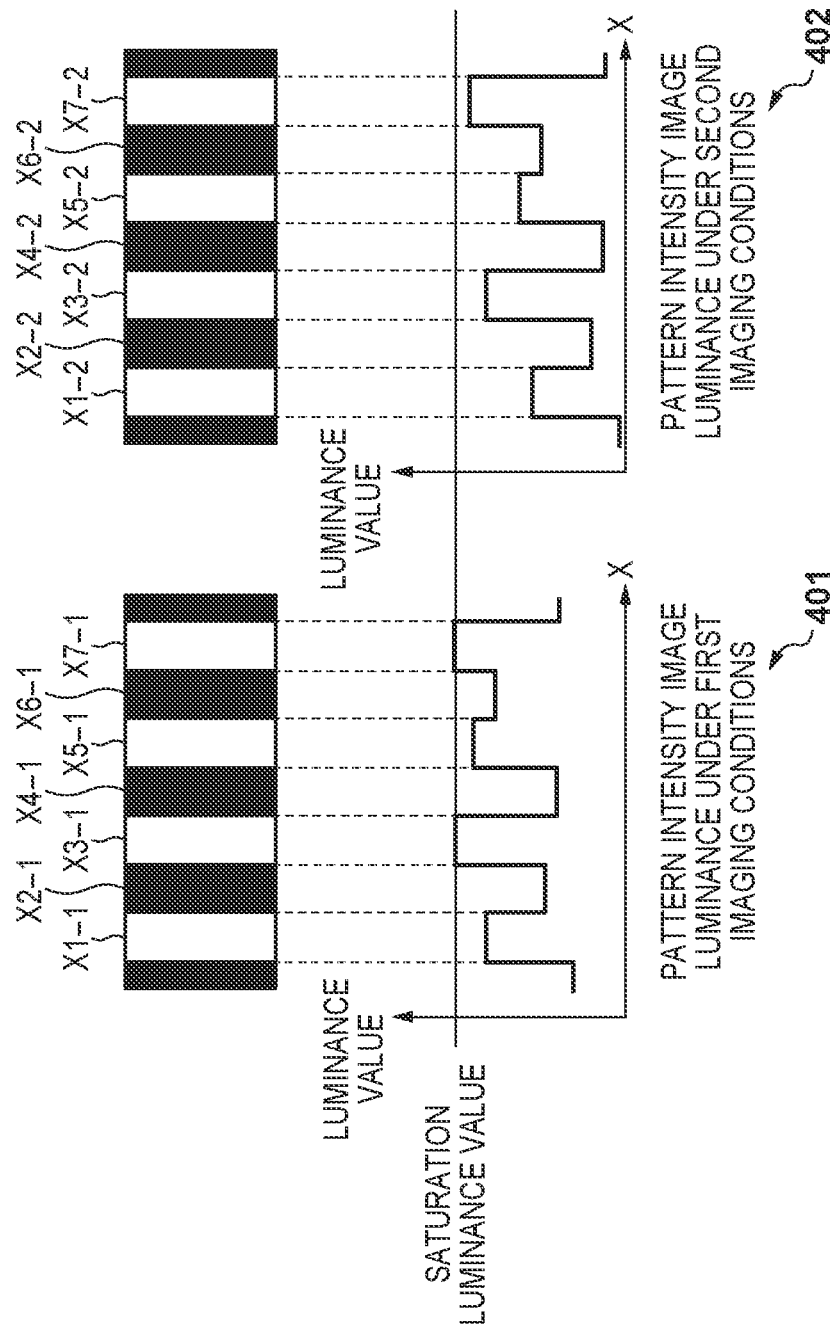

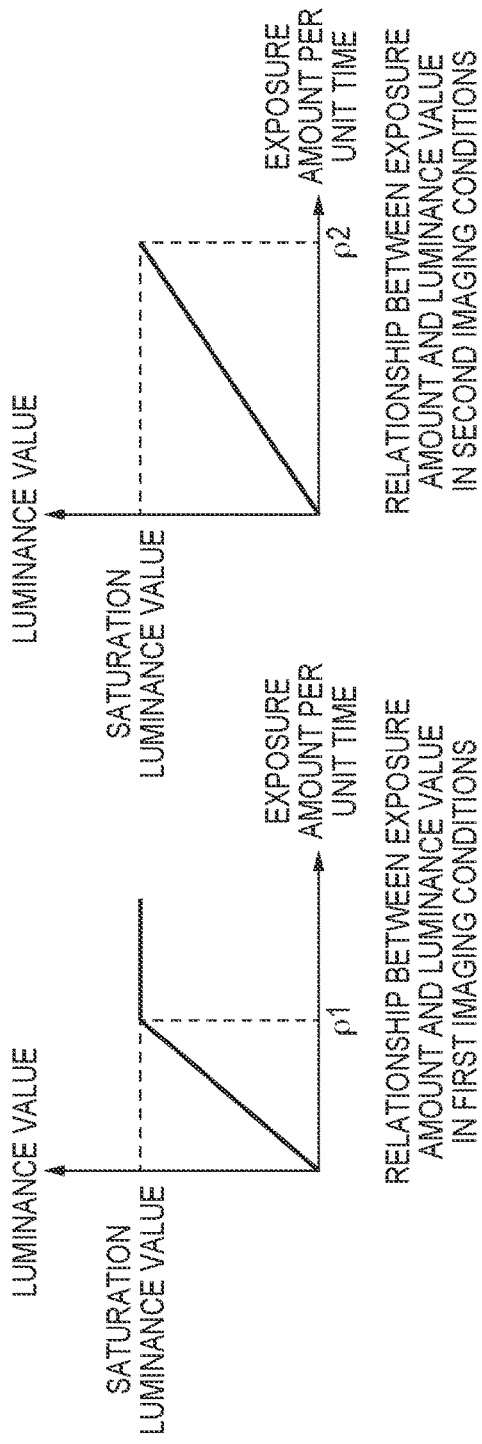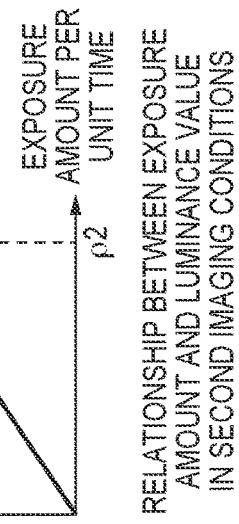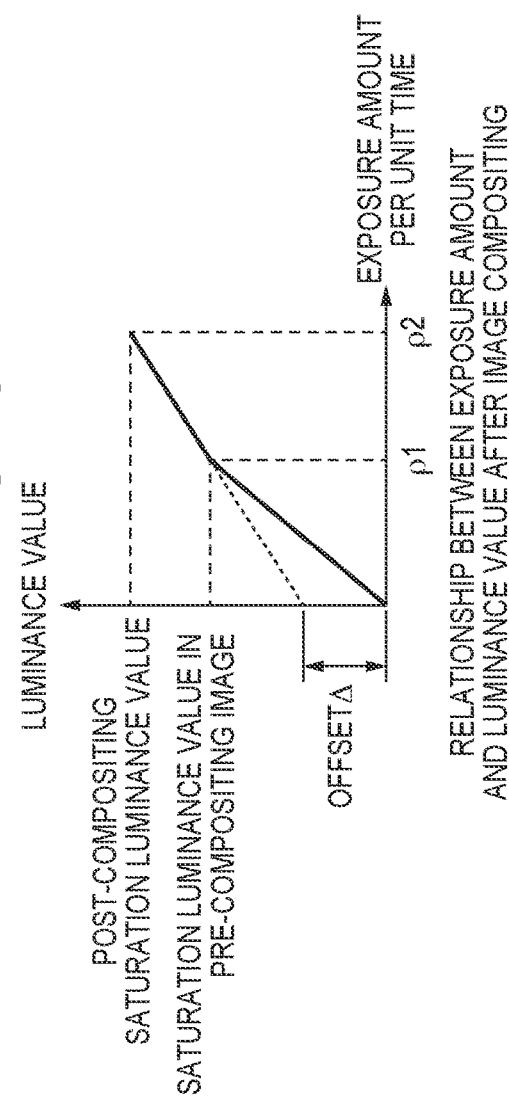

IMAGE LUMINANCE OBTAINED BY ADDING OFFSET Δ
TO PATTERN INTENSITY IMAGE LUMINANCE
UNDER SECOND IMAGING CONDITIONS

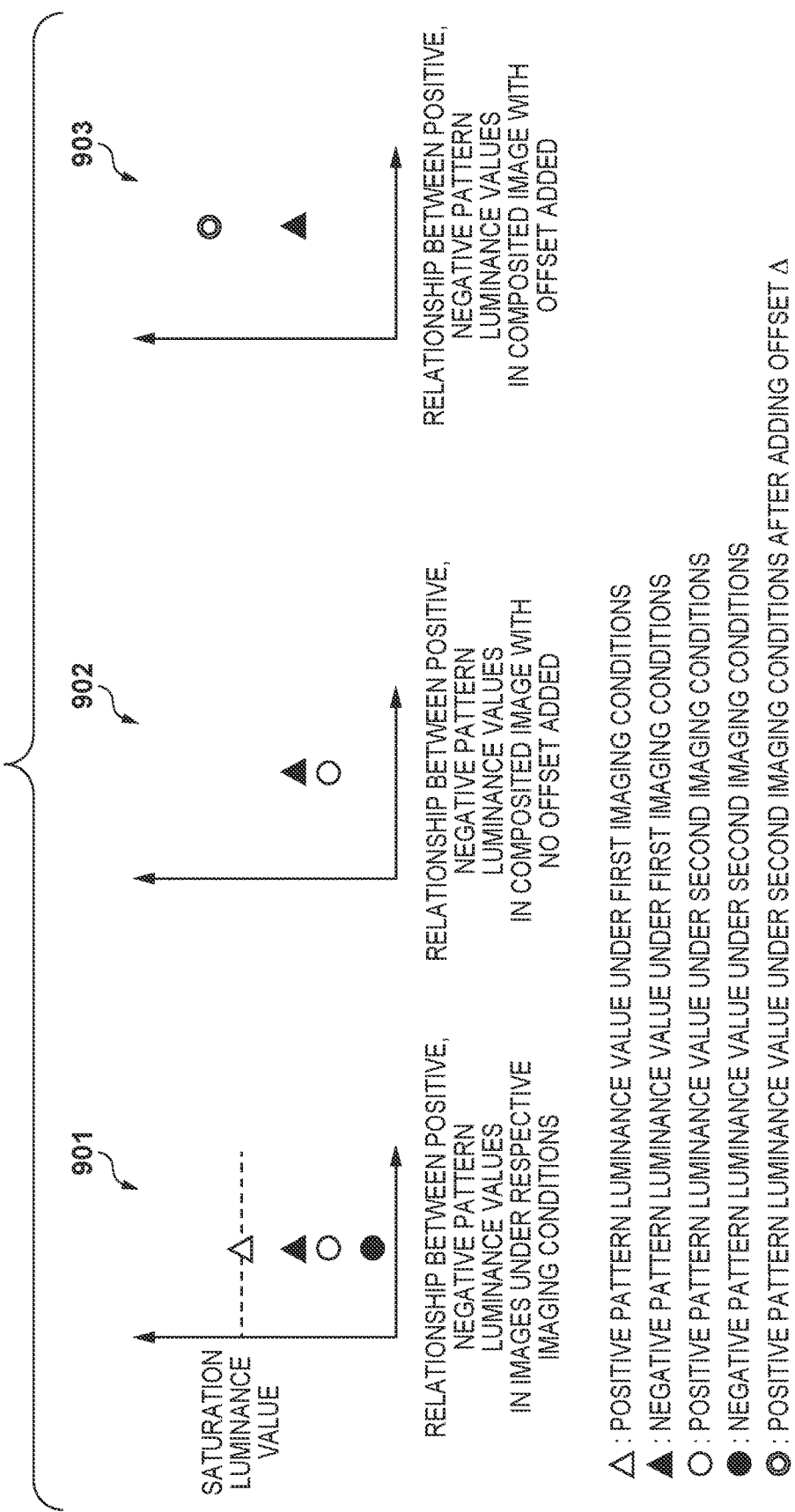

RELATIONSHIP BETWEEN EXPOSURE AMOUNT
AND LUMINANCE VALUE IN FIRST IMAGING CONDITIONS

RELATIONSHIP BETWEEN EXPOSURE AMOUNT
AND LUMINANCE VALUE IN SECOND IMAGING CONDITIONS

RELATIONSHIP BETWEEN EXPOSURE AMOUNT
AND LUMINANCE VALUE AFTER IMAGE COMPOSITING

RELATIONSHIP BETWEEN EXPOSURE AMOUNT
AND LUMINANCE VALUE IN FIRST IMAGING CONDITIONS

RELATIONSHIP BETWEEN EXPOSURE AMOUNT
AND LUMINANCE VALUE IN SECOND IMAGING CONDITIONS

RELATIONSHIP BETWEEN EXPOSURE AMOUNT
AND LUMINANCE AFTER IMAGE COMPOSITING

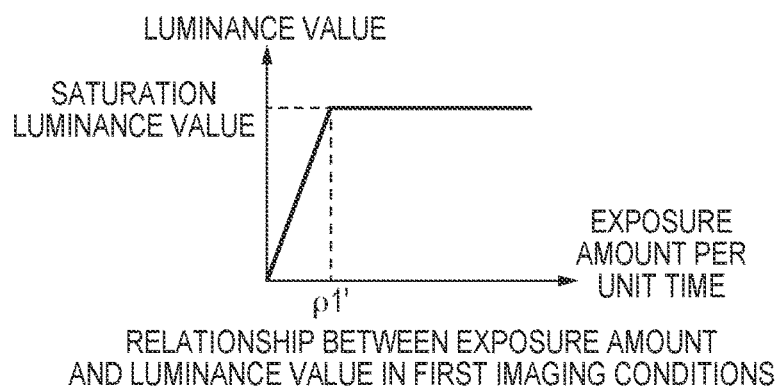

FIG. 16A RELATIONSHIP BETWEEN EXPOSURE AMOUNT AND LUMINANCE VALUE IN FIRST IMAGING CONDITIONS

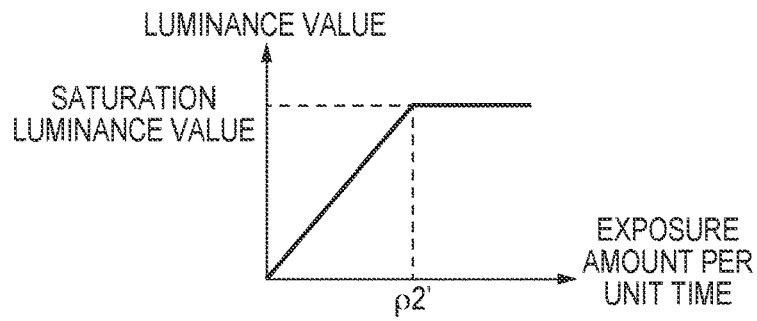

FIG. 16B RELATIONSHIP BETWEEN EXPOSURE AMOUNT AND LUMINANCE VALUE IN SECOND IMAGING CONDITIONS

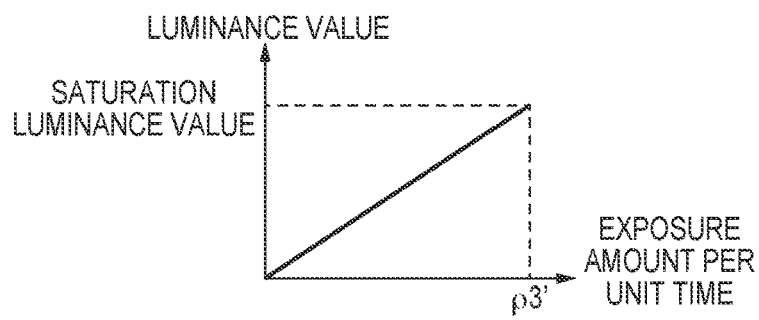

FIG. 16C RELATIONSHIP BETWEEN EXPOSURE AMOUNT AND LUMINANCE VALUE IN THIRD IMAGING CONDITIONS

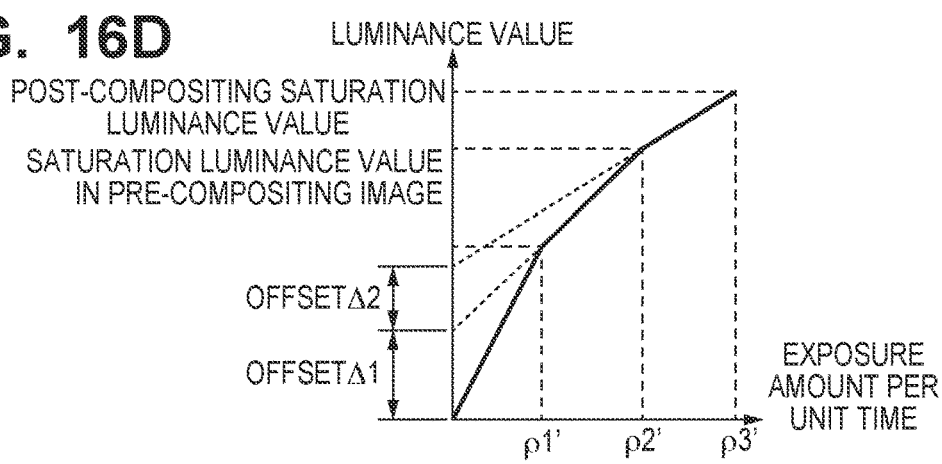

FIG. 16D RELATIONSHIP BETWEEN EXPOSURE AMOUNT AND LUMINANCE AFTER IMAGE COMPOSITING

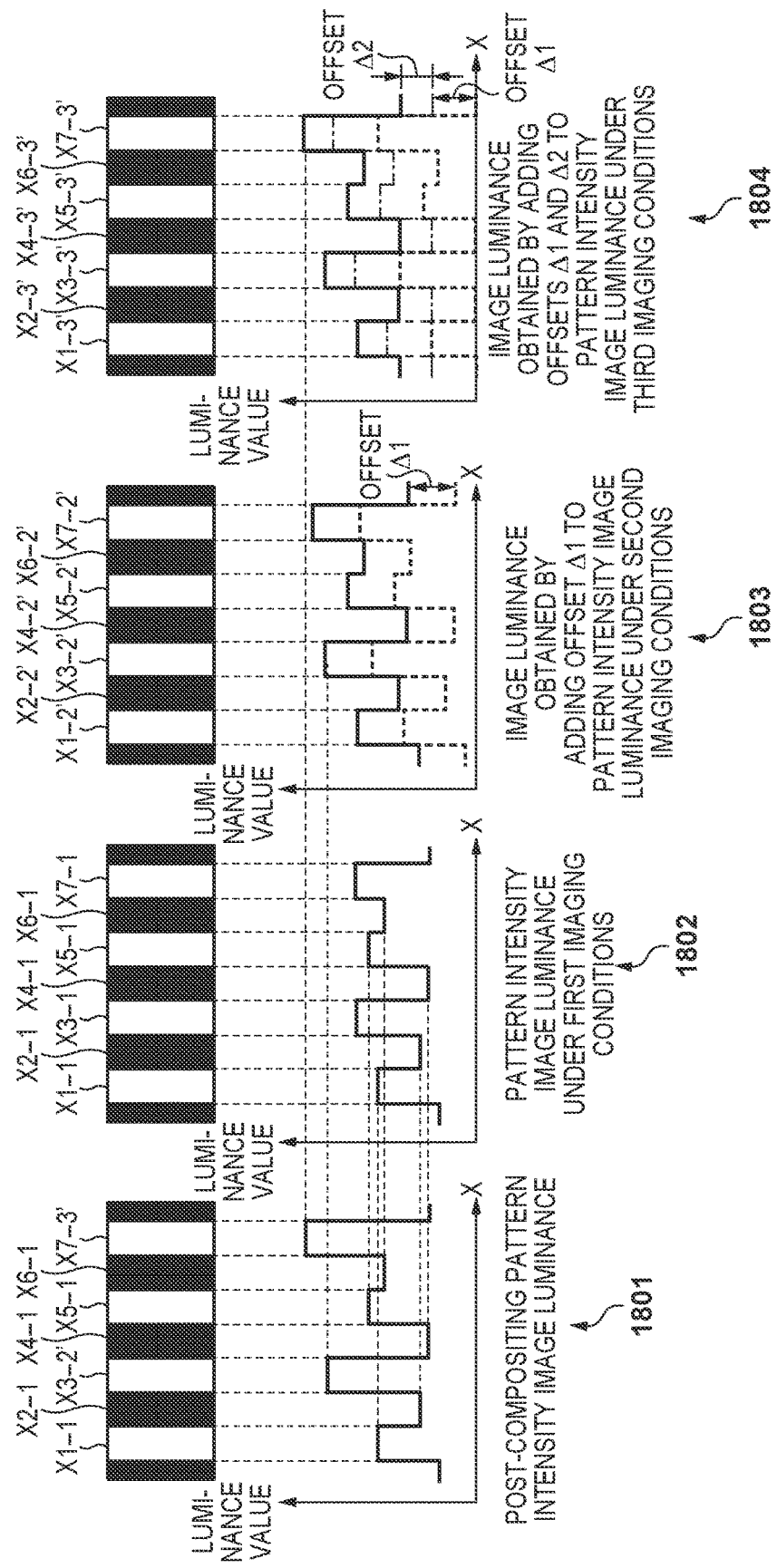

THREE DIMENSIONAL MEASUREMENT APPARATUS, CONTROL METHOD FOR THREE DIMENSIONAL MEASUREMENT APPARATUS, AND STORAGE MEDIUM

BACKGROUND OF THE INVENTION

Field of the Invention

The present invention relates to a three dimensional measurement apparatus, a control method for a three dimensional measurement apparatus, and a storage medium.

Description of the Related Art

A space coding pattern projecting technique is known as a method for measuring the shape of a measurement subject from image information using the principle of triangulation. A plurality of lattice patterns are projected onto a measurement subject by a projection device such as a projector, images of the plurality of lattice patterns are captured by an image capturing device, and the shape of the measurement subject is measured from light and dark positions in the lattice pattern and the geometric relationship between the image capturing device and the projection device. In the space coding pattern projection technique, the three-dimensional shape of the measurement subject is measured by analyzing codes associated with the light and dark positions in the projected patterns as heights from a reference surface at each of points on the measurement subject. However, in three-dimensional shape measurement using such a space coding pattern projection technique, problems can arise in the case where regions having various reflection characteristics, such as low-reflection regions and high-reflection regions, are broadly distributed across the surface of the measurement subject. For example, it may not be possible to cover a broad reflection distribution range even if the light intensity of a light source for projecting the patterns or the exposure of the image capturing device is adjusted.

In response to this, Japanese Patent Laid-Open No. 62-21011 discloses a method that uses an image capturing unit to obtain grayscale image data having gradations by capturing an image of a light section line generated through a light-section method that uses slit light. An image is composited from line light images captured under a plurality of imaging conditions by replacing the luminances of saturated pixels with the highest luminance value that is under a saturation luminance, and the three-dimensional shape of the measurement subject is measured from that image, making it possible to measure the shape of a measurement subject having a broad range of reflection characteristics.

Meanwhile, according to Japanese Patent Laid-Open No. 2007-271530, the shape of a measurement subject is measured by using a space coding pattern projection technique to associate space codes from pattern intensity images captured under a plurality of imaging conditions and then integrate the space codes under the conditions where the average luminance of the image is the highest.

However, the technique disclosed in Japanese Patent Laid-Open No. 62-21011 simply replaces luminances in an image with the highest luminance value that is not saturated. As such, there is a problem in that when using a space coding pattern projection technique and associating codes with light and dark positions in the pattern, erroneous associations can occur, which makes it difficult to accurately measure a three-dimensional shape.

Meanwhile, according to the technique disclosed in Japanese Patent Laid-Open No. 2007-271530, it is necessary to associate and integrate space codes from pattern intensity images captured under a plurality of imaging conditions, which involves a high amount of processing and uses a large amount of system memory. There is thus a problem in that it is difficult to measure a three-dimensional shape quickly.

The present invention provides a technique for quickly and accurately measuring the three-dimensional shape of a measurement subject.

SUMMARY OF THE INVENTION

According to one aspect of the present invention, there is provided a three dimensional measurement apparatus that measures a three-dimensional shape of a measurement subject on the basis of an image obtained by capturing, by an image capturing unit, the measurement subject onto which a pattern is projected, the apparatus comprising: a compositing unit configured to composite a first image and a second image of the measurement subject respectively obtained under first imaging conditions and second imaging conditions that are different from the first imaging conditions, so that a relationship of an exposure amount produced by light incident on an image sensor of the image capturing unit and the magnitude of a luminance value corresponding to the exposure amount is maintained between the first image and the second image; and a measuring unit configured to measure the three-dimensional shape of the measurement subject on the basis of the image composited by the compositing unit.

Further features of the present invention will become apparent from the following description of exemplary embodiments with reference to the attached drawings.

BRIEF DESCRIPTION OF THE DRAWINGS

FIG. 2 is a flowchart illustrating a sequence of processing carried out by a three dimensional measurement apparatus according to a first embodiment of the present invention.

FIG. 3 is a diagram illustrating an example of projected patterns according to an embodiment of the present invention.

FIG. 4 is a diagram illustrating an example of luminances in pattern intensity images under a plurality of sets of imaging conditions, according to the first embodiment of the present invention.

FIGS. 5A to 5C are diagrams illustrating a relationship between an exposure amount and a luminance value before and after image compositing, according to the first embodiment of the present invention.

FIG. 9 is a diagram illustrating superiority according to the present invention.

FIGS. 16A to 16D are diagrams illustrating a relationship between an exposure amount and a luminance value before and after image compositing, according to the third embodiment of the present invention.

FIG. 18 is a diagram illustrating an example of a composited image luminance to which an offset has been added, according to the third embodiment of the present invention.

DESCRIPTION OF THE EMBODIMENTS

Exemplary embodiments of the present invention will now be described in detail with reference to the drawings. It should be noted that the relative arrangement of the components, the numerical expressions, and numerical values set forth in the embodiments do not limit the scope of the present invention unless it is specifically stated otherwise.

First Embodiment

Figure 1:
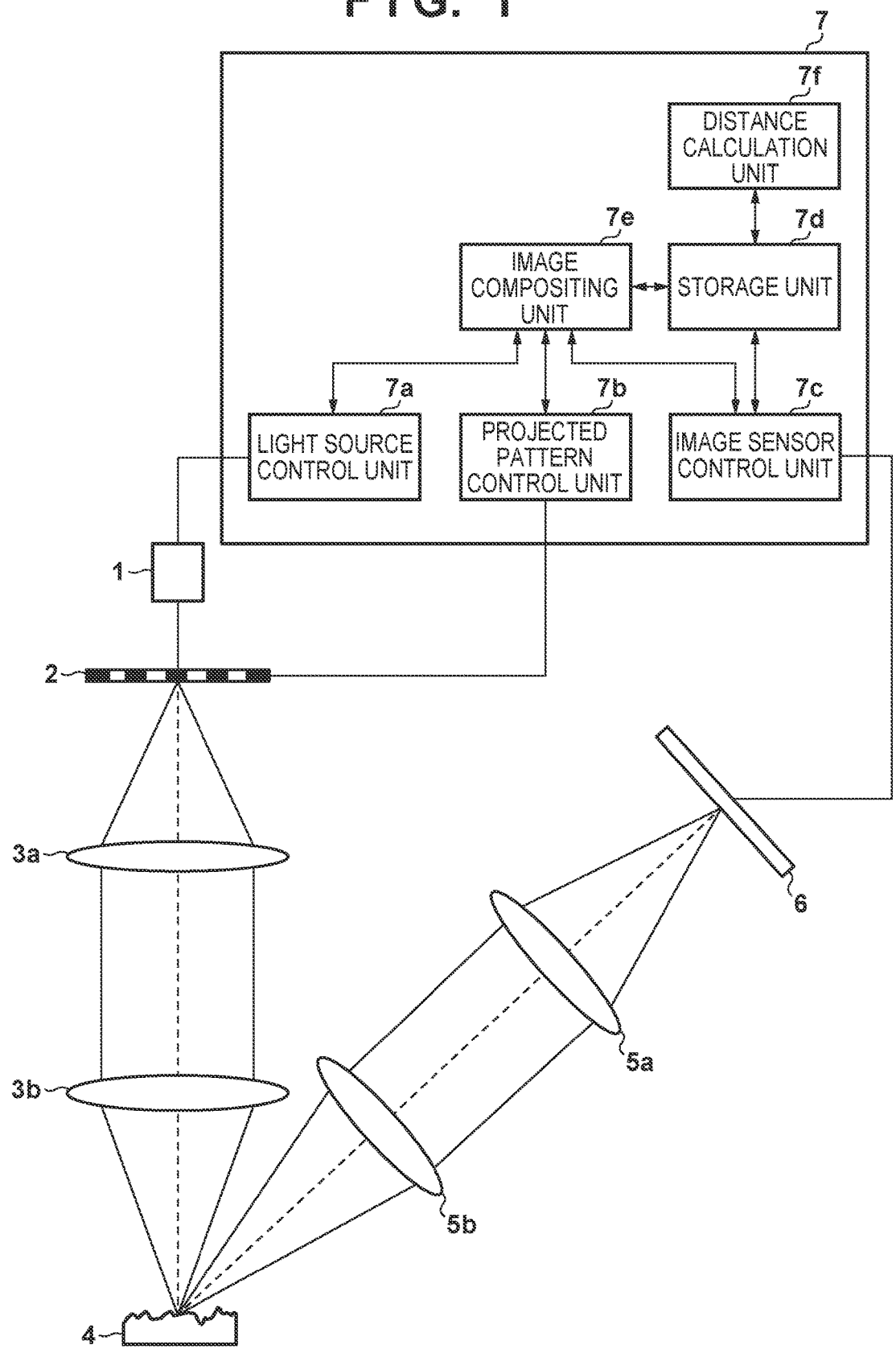
FIG. 1 is a diagram illustrating a three dimensional measurement apparatus according to an embodiment of the present invention.

FIG. 1 is a diagram illustrating a three dimensional measurement apparatus according to an embodiment of the present invention. The three dimensional measurement apparatus includes a light source 1, a pattern generating unit 2, projection lenses 3a and 3b, focusing lenses 5a and 5b, an image sensor 6, and a control/analysis section 7. For example, a projection section may be constituted by the pattern generating unit 2 and the projection lenses 3a and 3b, and an image capturing section may be constituted by the focusing lenses 5a and 5b and the image sensor 6.

The light source 1 emits a light beam. The pattern generating unit 2 generates a lattice pattern to be projected onto a measurement subject 4 and modulates the pattern. The projection lenses 3a and 3b irradiate the measurement subject 4 with the pattern. The focusing lenses 5a and 5b focus the pattern reflected by the measurement subject 4. The image sensor 6 obtains an intensity of a light beam scattered and reflected by the measurement subject 4. The control/analysis section 7 controls the light emission by the light source 1, the projected pattern generated by the pattern generating unit 2, an exposure time and gain of the image sensor 6, and so on, and calculates the shape of the measurement subject 4 from intensity information of the light beam obtained from the image sensor 6.

The control/analysis section 7 includes a light source control unit 7a, a projected pattern control unit 7b, an image sensor control unit 7c, a storage unit 7d, an image compositing unit 7e, and a distance calculation unit 7f. The light source control unit 7a controls a light emission intensity, a light emission time, and so on of the light source 1. The projected pattern control unit 7b controls changes and the like in the projected pattern generated by the pattern generating unit 2. The image sensor control unit 7c changes the exposure time and the like of the image sensor 6, captures images, and so on. The storage unit 7d stores captured images, results obtained while computing distances, and the like. The image compositing unit 7e composites stored images. The distance calculation unit 7f calculates the three-dimensional shape of the measurement subject 4 from the composited image.

An LED or the like is used for the light source 1. The light source 1 emits a light beam, and illuminates the pattern generating unit 2, which generates a lattice pattern in which light portions and dark portions are arranged cyclically. For example, a mask pattern in which light-blocking portions and non-light-blocking portions are arranged in a regular manner may be used as the pattern generating unit 2. Alternatively, a configuration in which any desired pattern, such as a monochromatic pattern, a sine wave-shaped pattern, or the like can be generated may be implemented by using a liquid-crystal element, a digital mirror device (DMD), or the like.

A light beam that has traversed the pattern generating unit 2 and thus has the lattice pattern is incident on the projection lenses 3a and 3b. The light beam exiting from the projection lens 3b irradiates the measurement subject 4, and the pattern generated by the pattern generating unit 2 is projected thereon as a result. The pattern reflected and scattered by the measurement subject 4 is incident on the focusing lenses 5a and 5b, and an image of the pattern the measurement subject 4 was irradiated with is formed on the image sensor 6. An optical intensity of the image of the pattern that has been formed is detected by the image sensor 6, which is a CCD, CMOS sensor, or the like. This optical intensity is then processed by the control/analysis section 7, which is constituted of a generic computer or the like including a CPU, a memory, a display, a storage device such as a hard disk, various types of input and output interfaces, and the like.

The intensity of the projected pattern is captured multiple times by the image sensor 6 at an exposure time and gain set by the image sensor control unit 7c while varying the light emission intensity set by the light source control unit 7a and the pattern projected onto the measurement subject 4 specified by the projected pattern control unit 7b. The image capturing results are then stored in the storage unit 7d.

The image compositing unit 7e then determines whether images have been captured under pre-set imaging conditions (a combination of the exposure time, the light emission intensity of the light source, and the gain of the image sensor, for example). In the case where images have not been captured under all of the imaging conditions, the light source control unit 7a changes the light emission intensity of the light source 1, the image sensor control unit 7c changes the exposure time and gain of the image sensor 6, the pattern is again projected onto the measurement subject 4, and the pattern intensity is captured. Once images have been captured under all of the imaging conditions, the image compositing unit 7e composites the captured pattern intensity images and stores the composited image in the storage unit 7d.

Then, the distance calculation unit 7f assigns a space code to each of regions of the measurement subject 4 on the basis of the intensity information from the composited pattern intensity image, and measures the three-dimensional shape of the measurement subject 4 from a geometric relationship between the pattern generating unit 2 and the image sensor 6.

Based on the above principles, an example will be described in which an image is composited from pattern intensity images captured under a plurality of sets of imaging conditions so as to expand a sensitivity region so that the relationship between the pattern intensity and the luminance value is consistent among the plurality of sets of imaging conditions, and the three-dimensional shape of the measurement subject is then measured from the image whose sensitivity region has been expanded.

In particular, the present embodiment will describe an example in which pattern intensity images captured under two different sets of imaging conditions (a combination of the exposure time, the light emission intensity of the light source, and the gain of the image sensor, for example) are composited so that a relationship between the exposure amount per unit time and the luminance value is consistent. This makes it possible to accurately measure the three-dimensional shape of the measurement subject without a magnitude relationship between the level of the exposure amount per unit time and the image luminance value inverting between imaging conditions.

FIG. 2 is a flowchart illustrating a sequence of processing carried out by the three dimensional measurement apparatus according to the first embodiment of the present invention.

In S101, the control/analysis section 7 sets one of two pre-set sets of imaging conditions in the light source 1 and the image sensor 6. Here, an exposure time, a light emission intensity of the light source, and a gain of the image sensor at which dark regions aside from shadows are captured brighter even if saturated pixels are present in the pattern intensity image are set as one set of the pre-set imaging conditions (called "first imaging conditions" hereinafter). An exposure time, a light emission intensity of the light source 1, and a gain of the image sensor 6 at which pixels saturated in the pattern intensity image obtained under the first imaging conditions do not saturate are set as the other set of imaging conditions (called "second imaging conditions" hereinafter). At this time, the exposure time, the light emission intensity of the light source 1, and the gain of the image sensor 6 may all be set to be different between the first imaging conditions and the second imaging conditions, or only one or two thereof may be set to be different.

In S102, the image sensor 6 captures the pattern intensity image under the imaging conditions set in S101. Patterns such as those indicated by 301 to 310 in FIG. 3 are projected in sequence at this time. Gray code patterns for a 4-bit space coding pattern projection technique are used in this example, and thus the light emitted from the projector can be divided into $2^4$ (=16). While the number of projected patterns will increase with the bit number, the number of divisions of the emitted light can be increased as well. For example, in the case of 10 bits, the light can be divided into $2^{10}$ (=1,024), which makes it possible to divide the measurement subject 4 into finer regions and measure the shape on a more detailed level.

In S103, the control/analysis section 7 determines whether or not pattern intensity images have been captured under all of the sets of the pre-set imaging conditions. In the case where images have not been captured under all of the sets of imaging conditions, the process returns to S101, where the control/analysis section 7 sets the imaging conditions under which an image has not yet been captured in the light source 1 and the image sensor 6. The process then advances to S102, where the pattern intensity image is once again captured. On the other hand, in the case where the pattern intensity images have been captured for all of the sets of the pre-set imaging conditions, the process moves to S104. In S104, the control/analysis section 7 composites the pattern intensity images so as to maintain a magnitude relationship between the level of the exposure amount per unit time and the luminance value between the sets of imaging conditions, thus generating an image having an expanded sensitivity region.

The compositing of the pattern intensity images according to the present embodiment will be described here with reference to 401 and 402 in FIG. 4. First, 401 indicates luminance values of a pattern intensity image captured under the first imaging conditions, which are set so that dark regions can be captured brighter, or in other words, are set to eliminate blocked-out shadows. Of pixels X1-1 to X7-1, pixels X3-1 and X7-1 are saturated. Meanwhile, 402 indicates luminance values of a pattern intensity image captured under imaging conditions set so that the pixels do not saturate, or in other words, set so as to eliminate saturated pixels. None of the pixels X1-2 to X7-2 are saturated.

In the present embodiment, the luminance values of saturated pixels in the pattern intensity image captured under the first imaging conditions are replaced with other luminance values. Specifically, the pattern intensity images are composited by replacing the stated values with values obtained by adding an offset $\Delta$, set so that the exposure amount per unit time and the luminance value are consistent among the plurality of sets of imaging conditions, to the luminance values of the pixels in the pattern intensity image captured under the second imaging conditions.

In other words, the luminance values of the pixels X3-1 and X7-1 in 401 are replaced with values obtained by adding the offset $\Delta$ to the luminance values of the pixels X3-2 and X7-2 in 402. Next, the offset $\Delta$ will be described with reference to FIGS. 5A to 5C. FIG. 5A illustrates a relationship between the exposure amount per unit time and the luminance value of the image for pixels in the image sensor 6 under the first imaging conditions. Compared to the second imaging conditions, the first imaging conditions have a longer exposure time as well as a higher light emission intensity of the light source 1 and gain of the image sensor 6, resulting in saturation at an exposure amount $\rho1$ per unit time. As opposed to this, compared to the first imaging conditions, the second imaging conditions have a shorter exposure time and a lower light emission intensity of the light source 1 and gain of the image sensor 6, which makes it possible to obtain luminance values without saturation up to an exposure amount $\rho2$ per unit time that is greater than $\rho1$, as illustrated in FIG. 5B. It is necessary for the luminance values at $\rho1$ under the second imaging conditions to reach the saturation luminance values under the first imaging conditions in order for the relationship between the exposure amount per unit time and the luminance value to be consistent among the plurality of sets of imaging conditions, as illustrated in FIG. 5C. As such, assuming an exposure time is represented by $T_1$, a light emission intensity of the light source 1 is represented by $W_1$, and a gain of the image sensor 6 is represented by $G_1$ under the first imaging conditions, an exposure time is represented by $T_2$, a light emission intensity of the light source 1 is represented by $W_2$, and a gain of the image sensor 6 is represented by $G_2$ under the second imaging conditions, and a tone range of the image is represented by $\alpha$, the offset $\Delta$ can be expressed through the following Formula (1).

Formula 1

$$\Delta = \text{Roundup}\left(\alpha \times \left(1 - \frac{T_2}{T_1} \times \frac{W_2}{W_1} \times \frac{G_2}{G_1}\right)\right) \quad (1)$$

Figure 6:
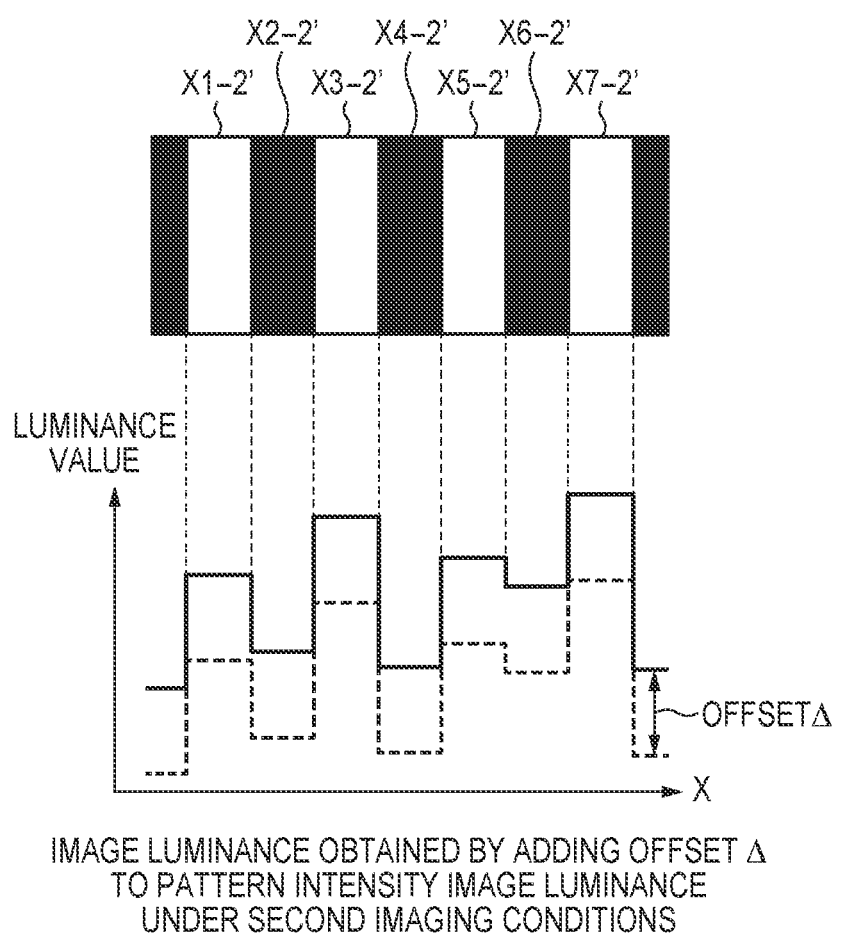
FIG. 6 is a diagram illustrating an example of an image luminance to which an offset has been added, according to the first embodiment of the present invention.

Here, Roundup( ) is a function that rounds the numerical value within the parentheses up to the nearest integer. α represents the tone range of the image, and in the case where the image tone is 12 bits, the range of luminance values in the image is $2^{12}$=4,096. The offset Δ calculated from the two different imaging conditions is added to the luminance values of the pattern intensity image captured under the second imaging conditions. FIG. 6 illustrates the pattern intensity image luminances to which the offset Δ has been added. In FIG. 6, the dotted line indicates the luminance values of the pattern intensity image captured under the second imaging conditions, whereas the solid line indicates the luminance values to which the offset Δ has been added. Adding the offset Δ results in the relationship between the pattern intensity and the luminance value being consistent among the plurality of sets of imaging conditions.

Next, the pattern intensity image captured under the first imaging conditions and the image obtained by adding the offset Δ to the pattern intensity image captured under the second imaging conditions are composited. In this image compositing, the luminances of saturated pixels in the pattern intensity image captured under the first imaging conditions are replaced with luminances obtained by adding the offset Δ to the luminance values of unsaturated pixels captured under the second imaging conditions.

Figure 7:
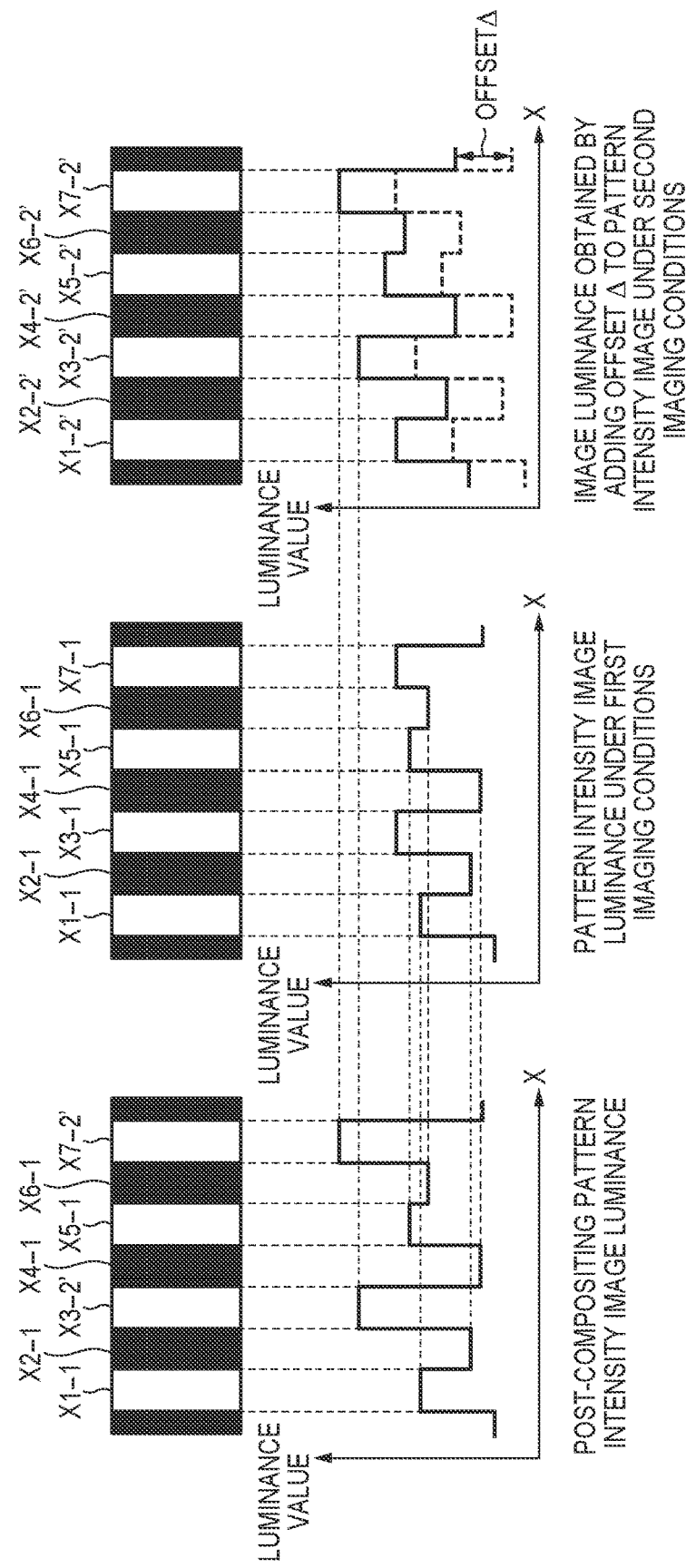
FIG. 7 is a diagram illustrating an example of a composited image luminance to which an offset has been added, according to the first embodiment of the present invention.

Here, FIG. 7 illustrates an overview of the composited pattern intensity image. The pattern intensity images are composited by replacing the respective luminance values of the saturated pixels X3-1 and X7-1 in the pattern intensity image captured under the first imaging conditions, indicated by 401 in FIG. 4, with the luminance values of pixels X3-2' and X7-2' of the image obtained by adding the offset Δ to the pattern intensity image captured under the second imaging condition, indicated in FIG. 6.

Figure 8:
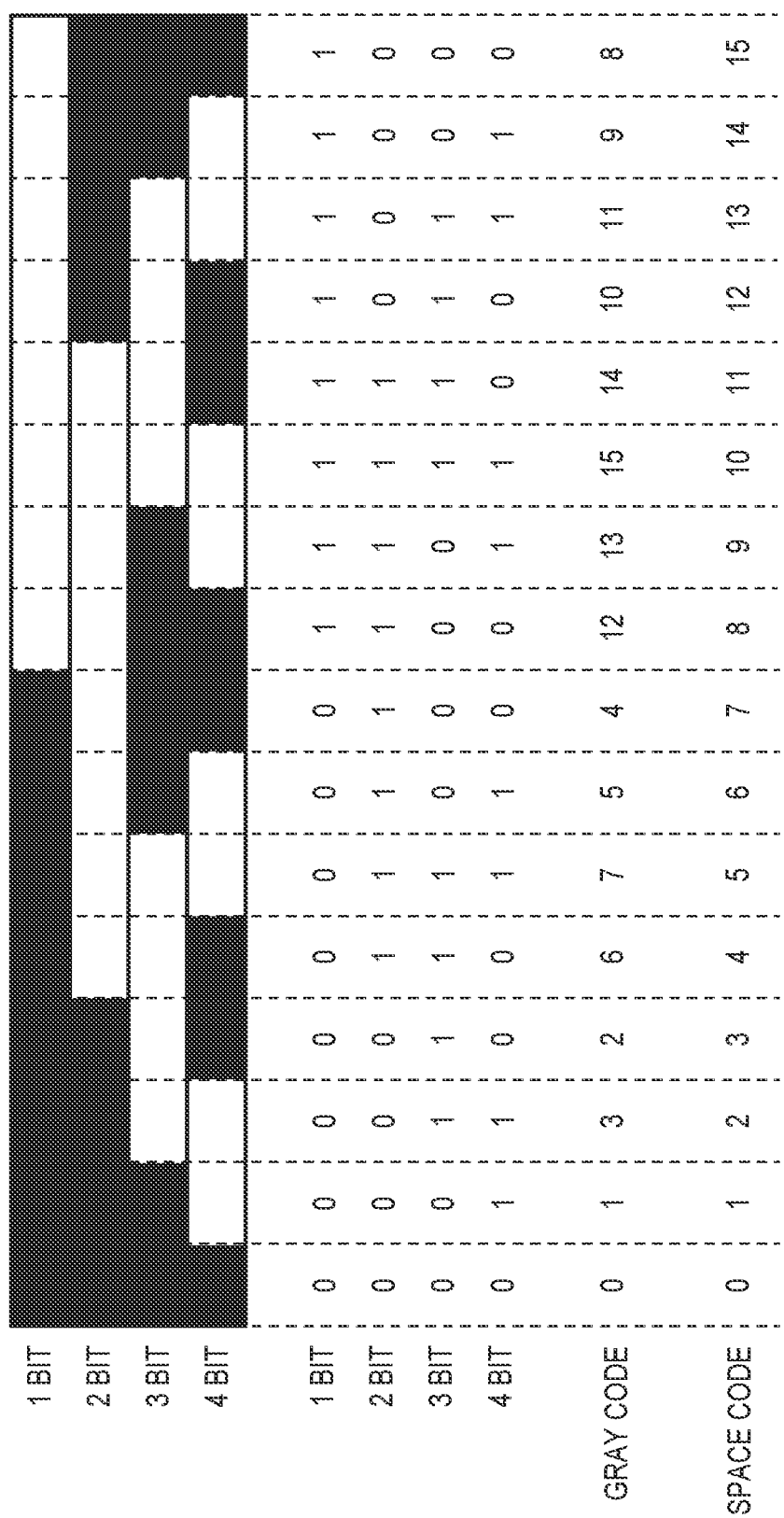
FIG. 8 is a diagram illustrating an example of space codes according to an embodiment of the present invention.

Next, in S105, the control/analysis section 7 measures the three-dimensional shape of the measurement subject 4 on the basis of the pattern intensity image composited in S104, after which the process ends. A space coding pattern projection technique is used in the present embodiment. In the space coding pattern projection technique, a light/dark determination is made on the basis of luminance information of the pattern intensity image for each bit, and a space code is assigned to each of regions in the captured range. For example, when making a light/dark determination and assigning a space code for the image corresponding to the first bit, an average value of a positive pattern luminance and a negative pattern luminance for the same pixels in a positive pattern image indicated by 302 in FIG. 3 and a negative pattern image indicated by 307 in FIG. 3 is used as a threshold. Then, a pixel brighter than the threshold is determined to be 1 and a pixel darker than the threshold is determined to be 0, and the space code is assigned. This is carried out for the pattern intensity image of each bit, and once the process is completed up to four bits, the space codes are assigned as indicated in FIG. 8. At this time, adding the offset Δ to the luminance values of the pattern intensity image captured under the second imaging conditions as per S104 makes it possible to assign the space codes correctly without making errors in the light/dark determination. The three-dimensional shape of the measurement subject 4 is then calculated from the assigned space codes and the geometric relationship between the pattern generating unit 2 and the image sensor 6.

Here, examples of results of compositing in the case where the offset has been added and in the case where the offset has not been added are illustrated in FIG. 9. 901 in FIG. 9 indicates a case where the luminance values of the positive pattern under the first imaging conditions are saturated and the luminance values of the positive pattern under the second imaging conditions are lower than the luminance values of the negative pattern under the first imaging conditions. In a case such as that indicated by 901, a magnitude relationship between the luminance values of the positive pattern and the luminance values of the negative pattern will invert in an image obtained through compositing without adding the offset Δ, as indicated by 902 in FIG. 9. This produces an error in the light/dark determination, and as a result, the space codes cannot be assigned correctly and the three-dimensional shape of the measurement subject 4 cannot be accurately measured.

However, in an image composited having added the offset Δ, the magnitude relationship between the luminance values of the positive pattern and the luminance values of the negative pattern is maintained as indicated by 903 in FIG. 9, which enables the light/dark determination to be carried out correctly. As such, the space codes can be assigned correctly, and the three-dimensional shape of the measurement subject 4 can be accurately measured.

Figure 10A:
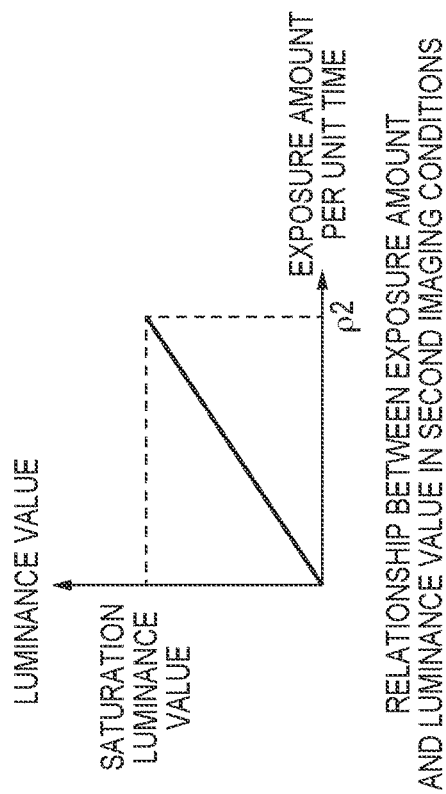
FIGS. 10A to 10C are diagrams illustrating a relationship between an exposure amount and a luminance value before and after image compositing.
Figure 10B:
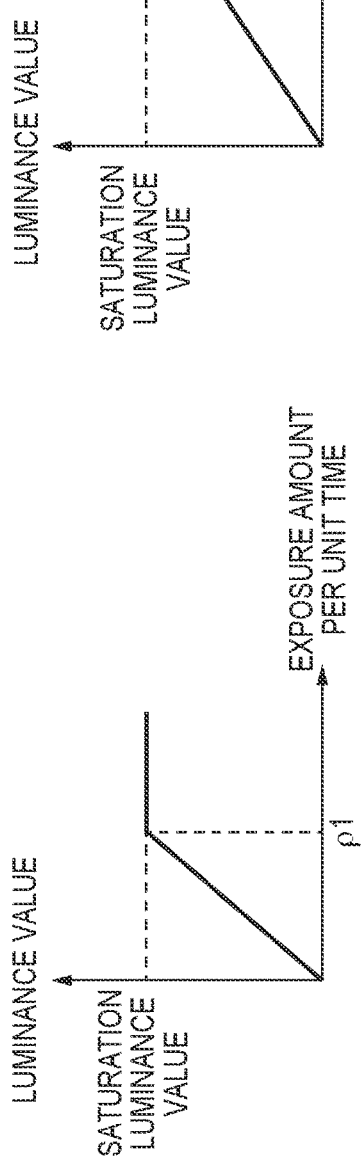
Figure 10C:
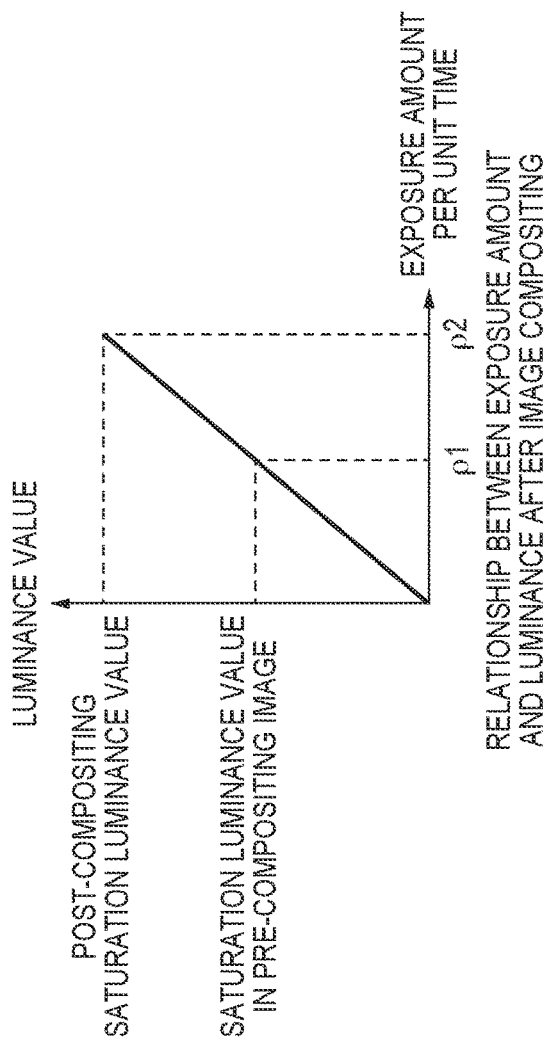

Meanwhile, a method that composites images by processing the image luminances so that the relationship between the exposure amount per unit time and the luminance matches among the respective imaging conditions, as indicated in FIGS. 10A to 10C, is well-known as an image compositing method that ensures the magnitude relationship between the luminance values of the positive pattern and the luminance values of the negative pattern does not invert. However, this method is often carried out by multiplying the image luminance value under the second imaging conditions by a ratio of luminance values at which the exposure amount per unit time is the same between the first imaging conditions and the second imaging conditions. Accordingly, a post-compositing saturation luminance value increases as the ratio of the luminance values between the first imaging conditions and the second imaging conditions increases. A greater amount of memory is therefore needed in the storage unit 7d to store the composited image.

On the other hand, in the case of two sets of imaging conditions, the number of tones in the post-compositing image will be less than twice the number of tones in the pre-compositing image even in the case where the luminance value ratio is greater than a multiple of two. However, although the saturation luminance value exceeds a multiple of two and the amount of memory needed in the storage unit 7d exceeds a multiple of two as well, the amount of information does not exceed a multiple of two and thus the memory is not used efficiently. For example, in the case where the pre-compositing image has 12 bit tones, 13 bit or higher tone values (8,192 or higher) will be necessary, but the number of tones will not exceed 8,192; as such, the data becomes fragmented within the memory space, and thus the memory is not used efficiently.

Figure 11:
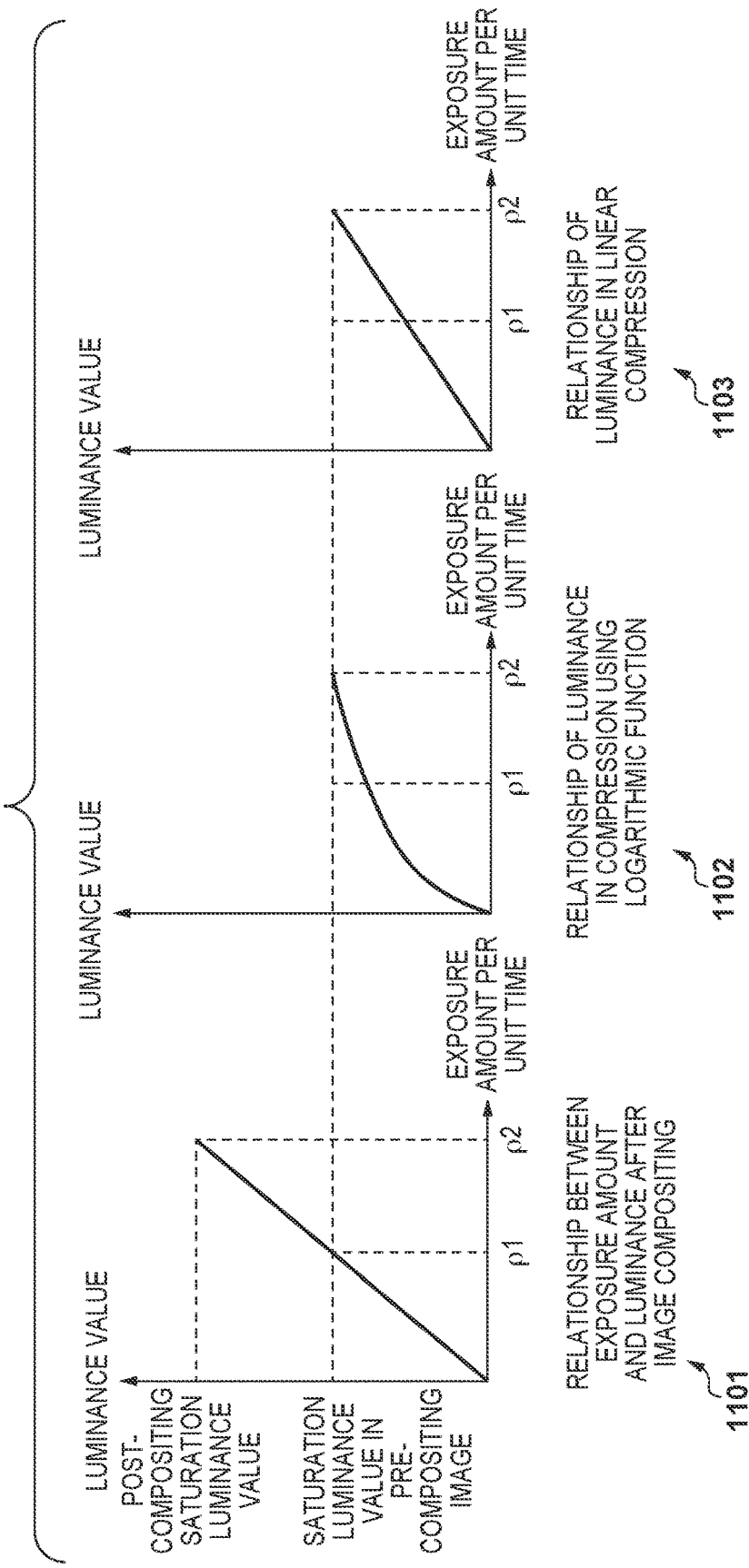
FIG. 11 is a diagram illustrating a relationship between an exposure amount and a luminance value in image range compression.

Meanwhile, in the case of compositing images from a plurality of sets of imaging conditions in order to increase the dynamic range, for photographs or the like that are to be viewed by people, the composited image may be compressed using a logarithmic function as indicated by 1102 in FIG. 11 in order to suppress an increase in the amount of memory that is used. Alternatively, an increase in the amount of memory used may be suppressed by compressing the tone range in a linear manner (reducing the number of bits), as indicated by 1103 in FIG. 11. However, in the case where such compression is used, in a range where the exposure amount per unit time is from ρ1 to ρ2 in 1101 of FIG. 11, the tone number does not change, but the tone range is extended more than a multiple of two, resulting in a lower data density, and thus problems are less likely to occur. However, in a range up to ρ1, where the data density is high, it is possible that a large amount of tone information will be lost.

As opposed to this, in the image compositing according to the present embodiment, even if the ratio of the luminance values has become a multiple of two or greater, the post-compositing saturation luminance will be less than a multiple of two. Accordingly, in the case where, for example, the tones of the pre-compositing image are 12 bit, the image can be expressed with 13-bit tone values or less (8,192 or less), which makes it possible to use the memory efficiently and store the post-compositing image with a minimal increase in the amount of memory used.

In addition, even if the post-compositing image luminance is compressed to the pre-compositing tone range, the data density will be constant regardless of the range of the exposure amount per unit time, preventing a large amount of information from being lost in a specific region. Accordingly, it is easier for a larger amount of tone information to remain after compression than with conventional methods. Furthermore, compared to a method in which the shape of the measurement subject is calculated from pattern intensity images under respective imaging conditions and integrated, such as that disclosed in Japanese Patent Laid-Open No. 2007-271530, the image compositing method according to the present embodiment requires a low amount of processing, which makes it possible to measure the three-dimensional shape of the measurement subject more quickly.

As such, according to the present embodiment, a three-dimensional shape can be measured quickly and accurately, with a minimal increase in memory usage, even for a measurement subject in which regions having various reflection characteristics such as low-reflection regions and high-reflection regions are widely distributed and sufficient shape measurement is difficult when capturing images under a single set of imaging conditions.

Second Embodiment

The present embodiment will describe an example in which a fixed value is used for the offset added during the image compositing, rather than being calculated from a plurality of sets of imaging conditions. The configuration of a three dimensional measurement apparatus necessary to realize the present embodiment is the same as that illustrated in FIG. 1. The functions of the respective constituent elements are also the same as in FIG. 1.

Figure 12:
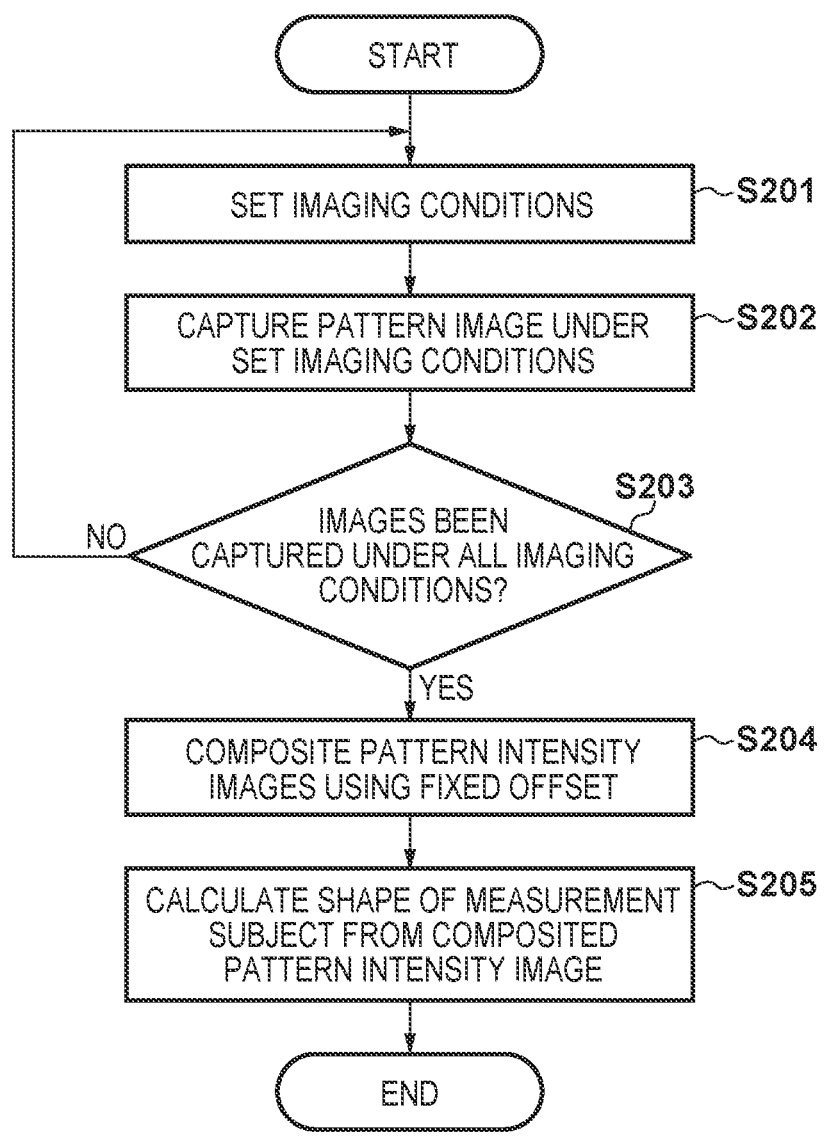
FIG. 12 is a flowchart illustrating a sequence of processing carried out by a three dimensional measurement apparatus according to a second embodiment of the present invention.

FIG. 12 is a flowchart illustrating a sequence of processing carried out by the three dimensional measurement apparatus according to a second embodiment of the present invention.

In S201, the control/analysis section 7 sets one of two sets of pre-set imaging conditions in the light source 1 and the image sensor 6, in the same manner as in S101. In S202, the image sensor 6 captures the pattern intensity image under the imaging conditions set in S201, in the same manner as in S102. In S203, the control/analysis section 7 determines whether or not pattern intensity images have been captured under all of the pre-set imaging conditions, in the same manner as in S103.

Next, in S204, the control/analysis section 7 generates an image having an expanded sensitivity region by compositing the pattern intensity images using an offset having a fixed value.

The compositing of the pattern intensity images according to the present embodiment will be described next. In the present embodiment as well, the pattern intensity images are composited by replacing the luminance values of saturated pixels in the pattern intensity image captured under the first imaging conditions with values obtained by adding the offset to the luminance values of the corresponding pixels in the pattern intensity image captured under the second imaging conditions. Note that the first imaging conditions and the second imaging conditions are the same as in the first embodiment.

The first embodiment describes an example in which the offset Δ is calculated so that the exposure amount per unit time and the luminance value are consistent among the plurality of sets of imaging conditions. As opposed to this, in the present embodiment, the pattern intensity images are composited using an offset $\Delta_{const}$ having a fixed value regardless of the plurality of sets of imaging conditions. The offset $\Delta_{const}$ is set to a value at which the magnitude relationship between the level of the exposure amount per unit time and the luminance value does not invert between the first imaging conditions and the second imaging conditions.

For example, the offset $\Delta_{const}$ is set to a value obtained by adding a predetermined value (1, for example) to the saturation luminance value of the pre-compositing pattern intensity image. For example, in the case where the tone range of the pre-compositing image is 12 bits, setting the offset $\Delta_{const}$ to 4,096 ($=2^{12}+1$) makes it possible to composite the pattern intensity images without the magnitude relationship of the exposure amount per unit time and the luminance value inverting between the first imaging conditions and the second imaging conditions.

Figure 13A:
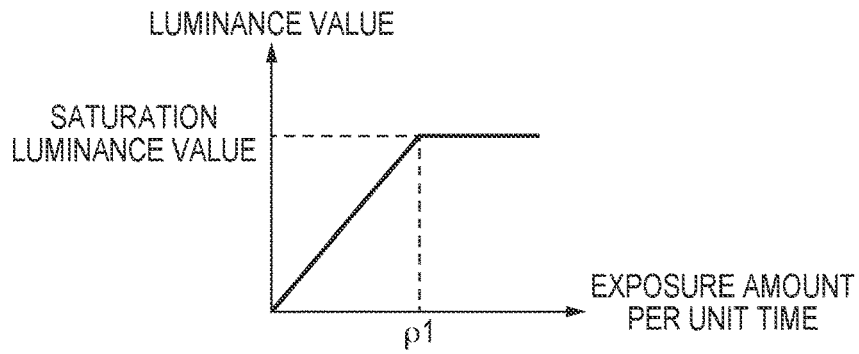
FIGS. 13A to 13C are diagrams illustrating a relationship between an exposure amount and a luminance value before and after image compositing, according to the second embodiment of the present invention.
Figure 13B:
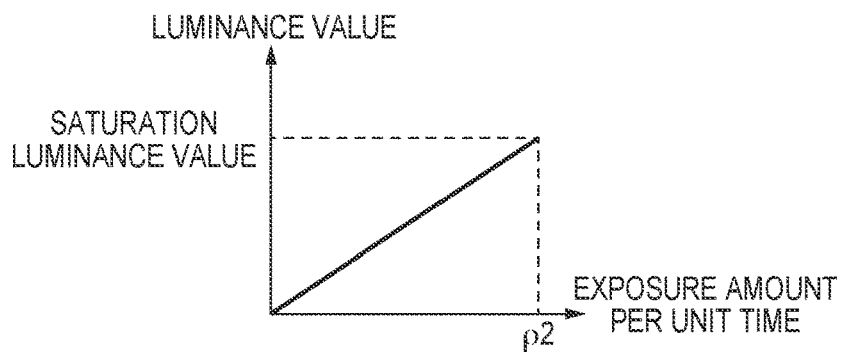
Figure 13C:
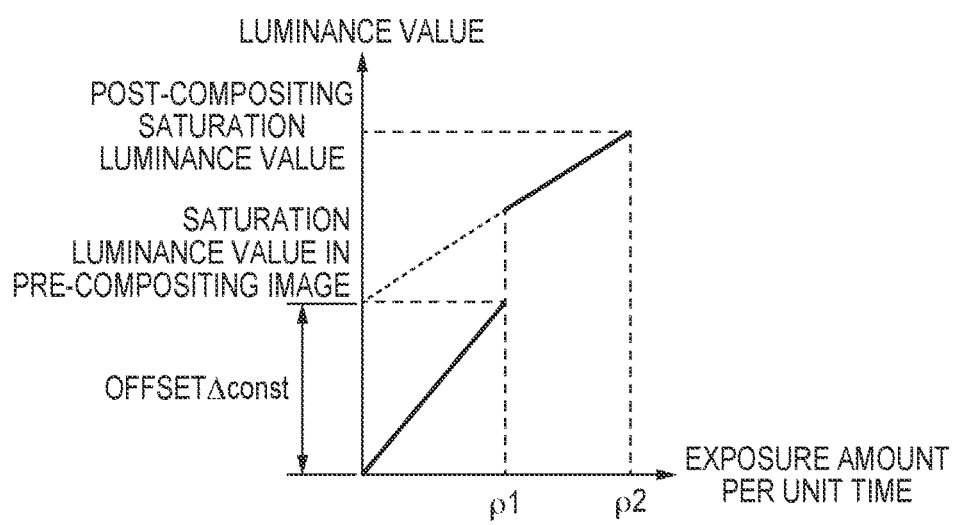

Here, FIG. 13C illustrates the relationship between the exposure amount per unit time and the luminance value in the case where the offset $\Delta_{const}$ having a fixed value is set to a value obtained by adding 1 to the saturation luminance value of the pre-compositing pattern intensity image. FIG. 13A illustrates a relationship between the exposure amount per unit time and the luminance value of the image under the first imaging conditions. FIG. 13B illustrates a relationship between the exposure amount per unit time and the luminance value of the image under the second imaging conditions. Although compositing using an offset having a fixed value greater than the saturation luminance value of the composited image results in a slight drop in the memory usage efficiency compared to the first embodiment, processing for calculating the offset is not required, which makes it possible to composite the pattern intensity images more quickly.

In addition, although the present embodiment describes a case where two sets of imaging conditions are used, even when there are three or more sets of imaging conditions, the offset $\Delta_{const}$ is added each time the pattern intensity images are composited, making it possible to composite the pattern intensity images so that the magnitude relationship of the level of the exposure amount per unit time and the luminance value does not invert.

Figure 14:
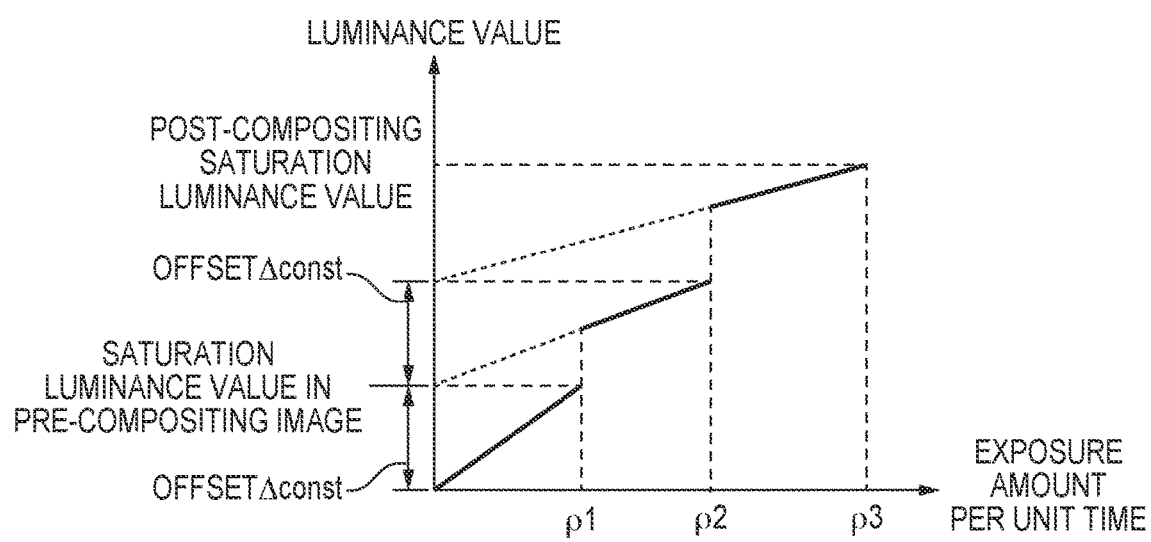
FIG. 14 is a diagram illustrating a relationship between an exposure amount and a luminance value before and after image compositing in the case where there are three imaging conditions, according to the second embodiment of the present invention.

FIG. 14 illustrates the relationship between the exposure amount per unit time and the luminance value in the case where images captured under three sets of imaging conditions are composited. In the case where third imaging conditions, where saturation occurs in the case where the exposure amount per unit time is ρ3, are added to the first imaging conditions and the second imaging conditions, the values thereof may be offset by $2 \times \Delta_{const}$ and added when compositing the pattern intensity image captured under the third imaging conditions.

Meanwhile, even in the case where there are N sets of imaging conditions (where N is a natural number), offsetting the image captured under Nth imaging conditions by $(N-1) \times \Delta_{const}$ and adding the values thereof makes it possible to composite the pattern intensity images without the magnitude relationship between the level of the exposure amount per unit time and the luminance value inverting.

In S205, the control/analysis section 7 measures the three-dimensional shape of the measurement subject 4 from the pattern intensity image composited in S204, in the same manner as in S105, after which the process ends. A space coding pattern projection technique is used in the present embodiment.

As described thus far, according to the present embodiment, the pattern intensity images can be composited with a lower amount of processing than in the first embodiment, which makes it possible to accurately measure a three-dimensional shape more quickly.

Third Embodiment

The present embodiment will describe an example in which different offsets are applied as the offsets added during image compositing, in the case where there are three sets of imaging conditions. The configuration of a three dimensional measurement apparatus necessary to realize the present embodiment is the same as that illustrated in FIG. 1. The functions of the respective constituent elements are also the same as in FIG. 1.

In the present embodiment, processing is carried out according to the same principles as in the first embodiment. Image compositing is carried out using pattern intensity images captured under three sets of imaging conditions so that the relationship between the exposure amount per unit time and the luminance value is consistent. As a result, the sensitivity region is expanded and the three-dimensional shape of the measurement subject 4 is measured from the image whose sensitivity region has been expanded.

A sequence of processing according to the present embodiment will be described hereinafter with reference to FIG. 2.

In S101, the control/analysis section 7 sets one of three pre-set imaging conditions in the light source 1 and the image sensor 6.

When the average luminances of the pattern intensity images are represented by $B_1$ to $B_3$, the three sets of imaging conditions are set so that the average luminances fulfill the following Formula (2).

Formula 2

$$B_1 > B_2 > B_3 \quad (2)$$

An exposure time, a light emission intensity of the light source, and a gain of the image sensor at which dark regions aside from shadows are captured brighter even if saturated pixels are present in the pattern intensity image are set as the first imaging conditions. Meanwhile, an exposure time, a light emission intensity of the light source, and a gain of the image sensor at which the average luminance $B_2$ of the pattern intensity image is as high as possible while remaining in a range where the pixels that are saturated in the pattern intensity image obtained under the first imaging conditions do not saturate are set as the second imaging conditions.

An exposure time, a light emission intensity of the light source, and a gain of the image sensor at which the average luminance $B_3$ of the pattern intensity image is as high as possible while remaining in a range where the pixels that are saturated in the pattern intensity image obtained under the second imaging conditions do not saturate are set as the third imaging conditions.

The three sets of imaging conditions may be set so that there are no saturated pixels and the average luminance is high in the post-compositing pattern intensity image. At this time, the exposure time, the light emission intensity of the light source, and the gain of the image sensor may all be set to be different between the first imaging conditions, the second imaging conditions, and the third imaging conditions, or only one or two thereof may be set to be different. The processes of S102 and S103 are the same as in the first embodiment, and thus descriptions thereof will be omitted.

Next, in S104, the control/analysis section 7 composites the pattern intensity images so as to maintain a magnitude relationship between the level of the exposure amount per unit time and the luminance value between the imaging conditions, thus generating an image having an expanded sensitivity region.

The compositing of the pattern intensity images according to the present embodiment will be described here with reference to FIG. 15. 1501 in FIG. 15 indicates luminance values of the pattern intensity image captured under the first imaging conditions, and of pixels X1-1 to X7-1, the pixels X3-1 and X7-1 are saturated. 1502 indicates luminance values of the pattern intensity image captured under the second imaging conditions, and of pixels X1-2 to X7-2, the pixel X7-2 is saturated. 1503 indicates luminance values of the pattern intensity image captured under the third imaging conditions, and none of pixels X1-3 to X7-3 are saturated.

In the present embodiment, when compositing the pattern intensity images, the saturated pixels in the image captured under the first imaging conditions are replaced with values obtained by adding an offset Δ1 calculated on the basis of the first imaging conditions and the second imaging conditions to the luminance values of the image captured under the second imaging conditions. Through this, a first stage of image compositing is carried out. Next, the saturated pixels in the composited image are replaced with values obtained by adding the offset Δ1 as well as an offset Δ2 calculated on the basis of the second imaging conditions and the third imaging conditions to the luminance values of the image captured under the third imaging conditions. Through this, a second stage of compositing is carried out, and the images captured under all of the imaging conditions are composited as a result.

Figure 15:
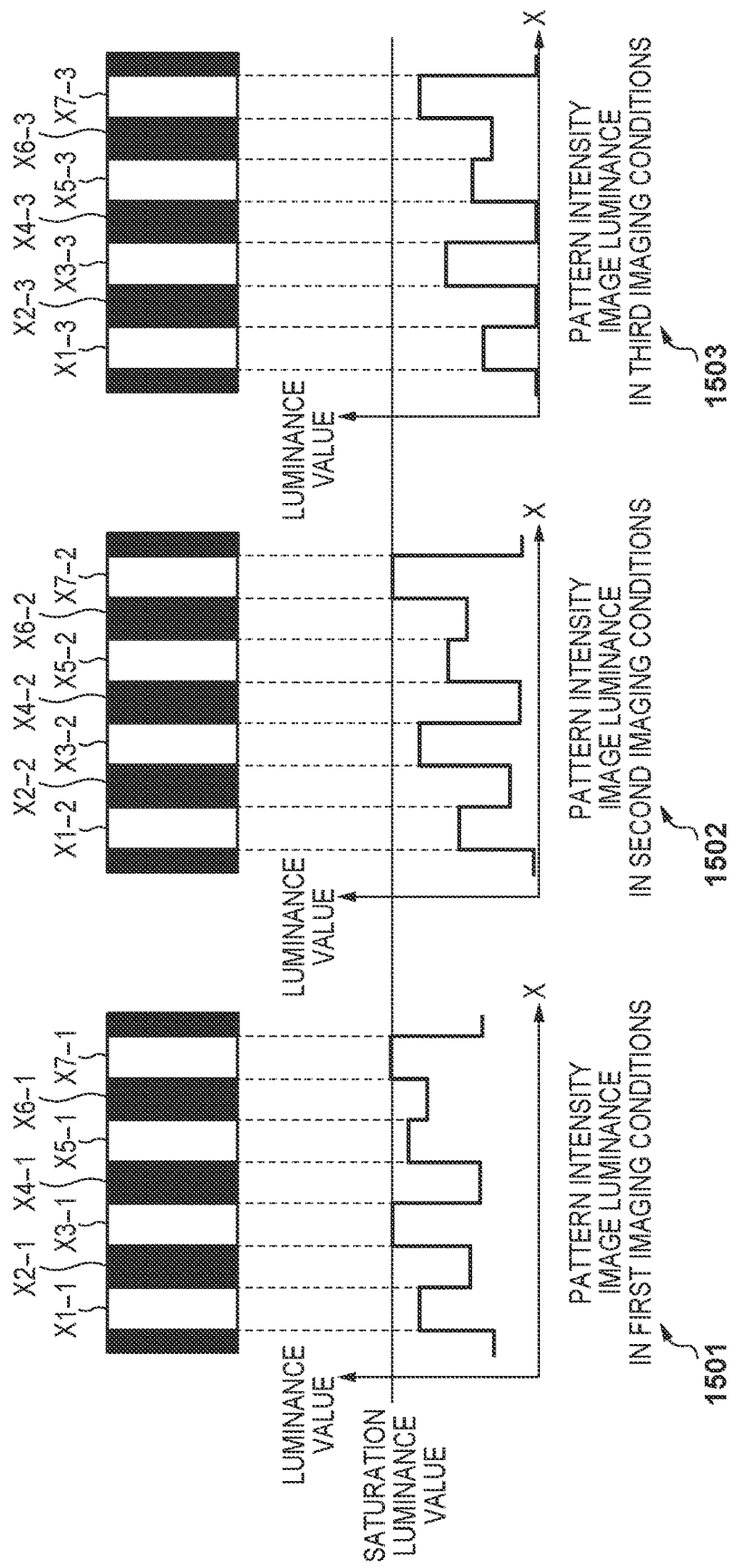
FIG. 15 is a diagram illustrating an example of luminances in pattern intensity images under a plurality of sets of imaging conditions, according to a third embodiment of the present invention.

Specifically, the luminance values of the pixels X3-1 and X7-1 in 1501 of FIG. 15 are first replaced with values obtained by adding the offset Δ1 to the luminance values of the pixels X3-2 and X7-2 in 1502. At this time, the offset Δ1 is set so that the relationship of the exposure amount per unit time and the luminance value between the first imaging conditions and the second imaging conditions is consistent.

Next, the luminance value of the pixel X7-2 in 1502 is replaced with a value obtained by adding the offset Δ1 and the offset Δ2 to the luminance value of the pixel X7-3 in 1503. At this time, the offset Δ2 is set so that the relationship of the exposure amount per unit time and the luminance value between the second imaging conditions and the third imaging conditions is consistent.

Next, the adding of the offset Δ1 and the offset Δ2 will be described with reference to FIGS. 16A to 16D. FIG. 16A illustrates a relationship between the exposure amount per unit time and the luminance value of the image under the first imaging conditions. Compared to the second imaging conditions and the third imaging conditions, the first imaging conditions have a longer exposure time as well as a higher light emission intensity of the light source 1 and gain of the image sensor 6, resulting in saturation at an incident light amount ρ1' per unit time on the pixels.

FIG. 16B illustrates a relationship between the exposure amount per unit time and the luminance value of the image under the second imaging conditions. Compared to the first imaging conditions, the second imaging conditions have a shorter exposure time and a lower light emission intensity of the light source 1 and gain of the image sensor 6, which makes it possible to obtain luminance values without saturation up to an exposure amount ρ2' per unit time that is greater than ρ1', as illustrated in FIG. 16B.

FIG. 16C illustrates a relationship between the exposure amount per unit time and the luminance value of the image under the third imaging conditions. Compared to the second imaging conditions, the third imaging conditions have a shorter exposure time and an even lower light emission intensity of the light source 1 and gain of the image sensor 6, which makes it possible to obtain luminance values without saturation up to an exposure amount ρ3' per unit time that is greater than ρ1' and ρ2', as illustrated in FIG. 16C.

It is necessary for the luminance values at ρ1' under the second imaging conditions to reach the saturation luminance values under the first imaging conditions in order for the relationship between the exposure amount per unit time and the luminance value to be consistent among the plurality of sets of imaging conditions, as illustrated in FIG. 16D. It is also necessary for the luminance value at ρ2' under the third imaging conditions to reach the saturation luminance value of the second imaging conditions.

Here, in the first imaging conditions, the exposure time is represented by $T_1$, the light emission intensity of the light source 1 is represented by $W_1$, and the gain of the image sensor 6 is represented by $G_1$. In the second imaging conditions, the exposure time is represented by $T_2$, the light emission intensity of the light source 1 is represented by $W_2$, and the gain of the image sensor 6 is represented by $G_2$. Furthermore, in the third imaging conditions, the exposure time is represented by $T_3$, the light emission intensity of the light source 1 is represented by $W_3$, the gain of the image sensor 6 is represented by $G_3$, and the tone range of the image is represented by a. Using these, the offset Δ1 and the offset Δ2 can be expressed through the following Formulae (3) and (4).

Formula 3

$$\Delta 1 = \text{Roundup}\left(\alpha \times \left(1 - \frac{T_2}{T_1} \times \frac{W_2}{W_1} \times \frac{G_2}{G_1}\right)\right) \quad (3)$$

Formula 4

$$\Delta 2 = \text{Roundup}\left(\alpha \times \left(1 - \frac{T_3}{T_2} \times \frac{W_3}{W_2} \times \frac{G_3}{G_2}\right)\right) \quad (4)$$

Here, Roundup( ) is a function that rounds the numerical value within the parentheses up to the nearest integer. α represents the tone range of the image, and in the case where the image tone is 12 bit, the range of luminance values in the image is $2^{12}=4,096$. The offset Δ1 is added to the luminance values of the pattern intensity image captured under the second imaging conditions. The offset Δ1 and the offset Δ2 are added to the luminance values of the pattern intensity image captured under the third imaging conditions.

Figure 17A:
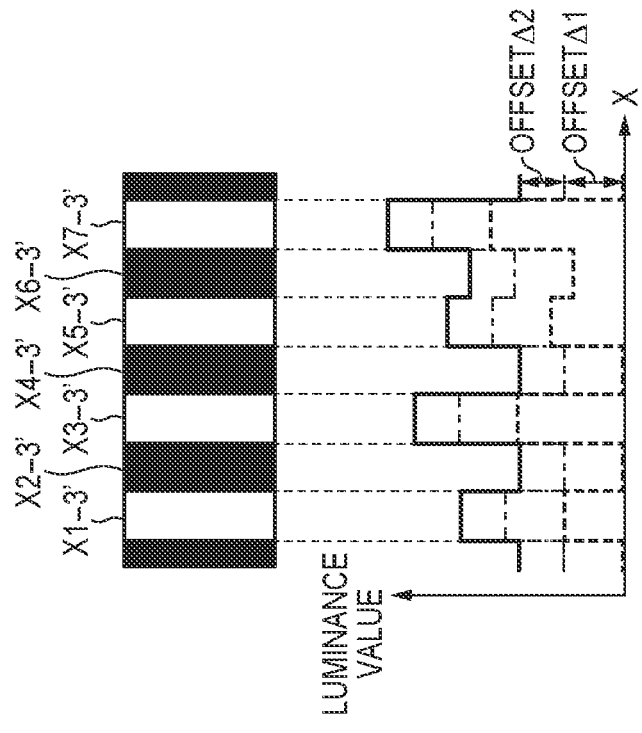
FIGS. 17A and 17B are diagrams illustrating an example of an image luminance to which an offset has been added, according to the third embodiment of the present invention.

FIG. 17A illustrates the pattern intensity image luminances to which the offset Δ1 has been added. In FIG. 17A, the dotted line indicates the luminance values of the pattern intensity image captured under the second imaging conditions, whereas the solid line indicates the luminance values to which the offset Δ1 has been added.

Figure 17B:
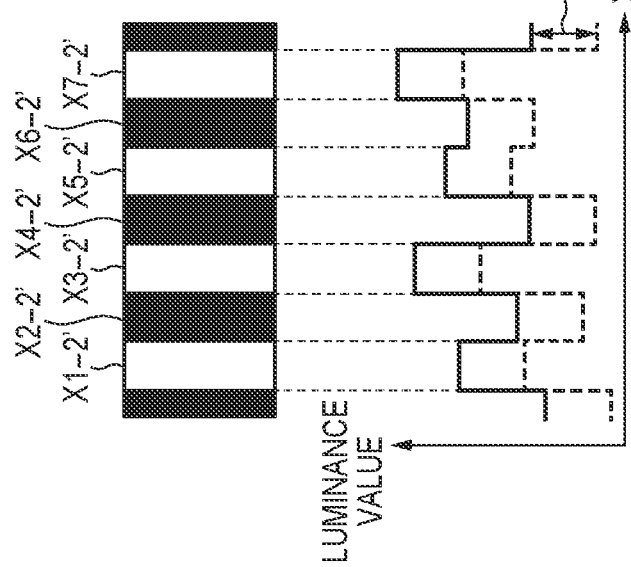

FIG. 17B, meanwhile, illustrates the pattern intensity image luminances to which the offset Δ1 and the offset Δ2 have been added. In FIG. 17B, the dotted line indicates the luminances of the pattern intensity image captured under the third imaging conditions, the dot-dash line indicates the luminance values to which the offset Δ1 has been added, and the solid line indicates the luminance values to which the offset Δ1 and the offset Δ2 have been added. Adding the offset Δ1 and the offset Δ2 makes it possible to make the relationship of the exposure amount per unit time and the luminance value under a plurality of sets of imaging conditions consistent.

Next, the pattern intensity image captured under the first imaging conditions and the image obtained by adding the offsets Δ1 and Δ2 to the pattern intensity images captured under the second imaging conditions and the third imaging conditions are composited.

In this image compositing, the luminances of saturated pixels in the pattern intensity image captured under the first imaging conditions are replaced with luminances obtained by adding the offset Δ1 to the luminance values of unsaturated pixels captured under the second imaging conditions. Next, the luminances of saturated pixels in the composited pattern intensity image are replaced with values obtained by adding the offset Δ1 and the offset Δ2 to the luminance values of pixels not saturated in the image captured under the third imaging conditions.

1801 in FIG. 18 indicates an example of the luminances of the post-compositing pattern intensity image. The luminance values of pixels X3-1 and X7-1, which are saturated in the pattern intensity image captured under the first imaging conditions as indicated by 1802, are respectively replaced with the luminance values of pixels X3-2' and X7-2' in an image obtained by adding the offset Δ1 to the pattern intensity image captured under the second imaging conditions, as indicated by 1803. Next, the luminance value of the pixel X7-2' in the image obtained by replacing the luminance values of the pixels X3-1 and X7-1 with the luminance values of the pixels X3-2' and X7-2' is replaced with the luminance value of a pixel X7-3' as indicated in 1804, thus compositing a pattern intensity image as indicated in 1801. This makes it possible to composite the pattern intensity image without a magnitude relationship between the level of the exposure amount per unit time and the luminance value inverting among the imaging conditions.

Next, in S105, the control/analysis section 7 measures the three-dimensional shape of the measurement subject 4 on the basis of the pattern intensity image composited in S104, after which the process ends, in the same manner as in the first embodiment. A space coding pattern projection technique is used in the present embodiment. As described above, in the present embodiment, with respect to three sets of imaging conditions, even if the ratio of luminance values under conditions having the same exposure amount per unit time has become a multiple of three or more, the post-compositing saturation luminance will only be less than a multiple of three. Accordingly, the image can be expressed with 14-bit tones, which makes it possible to use the memory efficiently and store the post-compositing image with a minimal increase in the amount of memory used.

Furthermore, the present invention can be applied in a case where the number of sets of imaging conditions has increased beyond three to N sets of imaging conditions (where N is a natural number). In this case, an offset Δ N−1 is calculated on the basis of N−1th imaging conditions and Nth imaging conditions. Then, the luminance values of saturated pixels in the pattern intensity image captured under the N−1th imaging conditions are replaced with luminances obtained by adding the offsets Δ1 to ΔN−1 to the luminance values of the pattern intensity image captured under the Nth imaging conditions. This makes it possible to composite a pattern intensity image with which the light/dark determination can be made correctly in the space coding pattern projection technique, without a magnitude relationship between the level of the exposure amount per unit time and the luminance value inverting among the imaging conditions.

As such, according to the present embodiment, a three-dimensional shape can be measured quickly and accurately, with a minimal increase in memory usage, even for a measurement subject in which regions having various reflection characteristics such as low-reflection regions and high-reflection regions are widely distributed and sufficient shape measurement is difficult when capturing images under a single set of imaging conditions.

According to the present invention, the three-dimensional shape of a measurement subject can be measured quickly and accurately.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-118605, filed Jun. 11, 2015, which is hereby incorporated by reference wherein in its entirety.

What is claimed is:

1. A three dimensional measurement apparatus that measures a three-dimensional shape of a measurement object using a composited image obtained by capturing, by an image capturing unit, the measurement object onto which a pattern is projected, the apparatus comprising:
a memory configured to store instructions; and
a processor configured to execute the stored instructions to:
composite a first image and a second image of the measurement object respectively captured by the image capturing unit under a first imaging condition and a second imaging condition that is different from the first imaging condition, by changing a luminance pixel value for one or more pixels in the second image such that the luminance pixel value in the second image, obtained in a case where light of a second exposure amount larger than a first exposure amount is incident on the image capturing unit under the second imaging condition, becomes larger than a luminance pixel value in the first image, obtained in a case where light of the first exposure amount is incident on the image capturing unit under the first imaging condition to maintain a magnitude relationship of an exposure amount of light incident on the image capturing unit and a luminance pixel value in an image obtained by the image capturing unit between the first image and the changed second image; and
measure the three-dimensional shape of the measurement object using the composited image.

2. The three dimensional measurement apparatus according to claim 1,
wherein the compositing is carried out so that the magnitude relationship between the exposure amount per unit time and the luminance pixel value corresponding to that exposure amount is consistent between the first imaging condition and the second imaging condition.

3. The three dimensional measurement apparatus according to claim 2,
wherein the processor is configured to execute further instructions to calculate an offset on the basis of the first imaging condition and the second imaging condition and the compositing is carried out using the offset.

4. The three dimensional measurement apparatus according to claim 3,
wherein the offset is calculated on the basis of an exposure time of a light source, a light emission intensity of the light source, a gain of the image capturing unit, and a tone range of an image for each of the first imaging condition and the second imaging condition.

5. The three dimensional measurement apparatus according to claim 1,
wherein the compositing is carried out by changing the luminance pixel value for one or more pixels in the second image using an offset having a fixed value.

6. The three dimensional measurement apparatus according to claim 5,
wherein the compositing is carried out by replacing the luminance pixel value of a saturated pixel in the first image captured under the first imaging condition with a value obtained by adding the offset to the luminance pixel value of a pixel in the second image captured under the second imaging condition.

7. The three dimensional measurement apparatus according to claim 1,
wherein at least one of an exposure time by a light source, a light emission intensity of the light source, and a gain of the image capturing unit differ between the first imaging condition and the second imaging condition.

8. The three dimensional measurement apparatus according to claim 1,
wherein the first image, the second image, and a third image of the measurement object respectively obtained under the first imaging condition, the second imaging condition, and third imaging condition are composited, so that a magnitude relationship of an exposure amount per unit time by a light source for projecting the pattern and a luminance pixel value corresponding to that exposure amount is maintained among the first image, the second image, and the third image.

9. The three dimensional measurement apparatus according to claim 8,
wherein, in the compositing:
a first offset is calculated on the basis of an exposure time of the light source, a light emission intensity of the light source, a gain of the image capturing unit, and a tone range of the image for each of the first imaging condition and the second imaging condition;
a second offset is calculated on the basis of an exposure time of the light source, a light emission intensity of the light source, a gain of the image capturing unit, and a tone range of the image for each of the second imaging condition and the third imaging condition; and
the compositing is carried out using the first offset and the second offset.

10. The three dimensional measurement apparatus according to claim 1, further comprising:
a projecting unit configured to project the pattern onto the measurement object; and
an image capturing unit configured to capture an image of the measurement object onto which the pattern has been projected.

11. A control method for a three dimensional measurement apparatus that measures a three-dimensional shape of a measurement object on the basis of an image obtained by capturing, by an image capturing unit the measurement object onto which a pattern is projected, the method comprising:
compositing a first image and a second image of the measurement object respectively captured by the image capturing unit under a first imaging condition and a second imaging condition that is different from the first imaging condition, by changing a luminance pixel value for one or more pixels in the second image such that the luminance pixel value in the second image, obtained in a case where light of a second exposure amount larger than a first exposure amount is incident on the image capturing unit under the second imaging condition, becomes larger than a luminance pixel value in the first image, obtained in a case where light of the first exposure amount is incident on the image capturing unit under the first imaging condition to maintain a magnitude relationship of an exposure amount of light incident on the image capturing unit and a luminance pixel value in an image obtained by the image capturing unit between the first image and the changed second image; and
measuring the three-dimensional shape of the measurement object using the composited image.

12. A non-transitory computer-readable storage medium storing a computer program for causing a computer to execute the steps of a control method for a three dimensional measurement apparatus that measures a three-dimensional shape of a measurement object on the basis of an image obtained by capturing, by an image capturing unit the measurement object onto which a pattern is projected, the method comprising:
compositing a first image and a second image of the measurement object respectively captured by the image capturing unit under a first imaging condition and a second imaging condition that is different from the first imaging condition, by changing a luminance pixel value for one or more pixels in the second image such that the luminance pixel value in the second image, obtained in a case where light of a second exposure amount larger than a first exposure amount is incident on the image capturing unit under the second imaging condition, becomes larger than a luminance pixel value in the first image, obtained in a case where light of the first exposure amount is incident on the image capturing unit under the first imaging condition to maintain a magnitude relationship of an exposure amount of light incident on the image capturing unit and a luminance pixel value in an image obtained by the image capturing unit between the first image and the changed second image; and
measuring the three-dimensional shape of the measurement object using the composited image.

13. The three dimensional measurement apparatus according to claim 1, wherein the processor is further configured to execute the instructions to change the luminance pixel value in the second image by adding an offset value to the luminance pixel value in the second image.

14. The three dimensional measurement apparatus according to claim 13, wherein the offset value is a value determined on the basis of the first imaging condition and the second imaging condition.

* * * * *